United States Patent
Ma et al.

(10) Patent No.: US 9,519,424 B2
(45) Date of Patent: Dec. 13, 2016

(54) TOUCH-CONTROL METHOD, RELATED APPARATUS, AND TERMINAL DEVICE

(71) Applicant: Huawei Technologies Co., Ltd., Shenzhen (CN)

(72) Inventors: Xiaojuan Ma, Hong Kong (CN); Wenyuan Dai, Hong Kong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 28 days.

(21) Appl. No.: 14/566,094

(22) Filed: Dec. 10, 2014

(65) Prior Publication Data

US 2015/0186032 A1    Jul. 2, 2015

(30) Foreign Application Priority Data

Dec. 30, 2013  (CN) .......................... 2013 1 0746473

(51) Int. Cl.
*G06F 3/0488*    (2013.01)
*G06F 3/01*    (2006.01)

(52) U.S. Cl.
CPC ........... *G06F 3/04883* (2013.01); *G06F 3/013* (2013.01)

(58) Field of Classification Search
CPC .... G06F 3/0488; G06F 3/04883; G06F 3/044; G06F 3/04886; G06F 3/045; G06F 3/0412; G06F 3/0416; G06F 3/046; G06F 3/013
See application file for complete search history.

(56) References Cited

U.S. PATENT DOCUMENTS

| | | | |
|---|---|---|---|
| 2012/0257035 A1 | 10/2012 | Larsen | |
| 2013/0145304 A1* | 6/2013 | DeLuca | G06F 3/013 715/781 |
| 2014/0361996 A1* | 12/2014 | Eden | G06F 3/013 345/173 |
| 2014/0368442 A1* | 12/2014 | Vahtola | G06F 3/013 345/173 |
| 2015/0049035 A1* | 2/2015 | Kim | G06F 3/013 345/173 |
| 2015/0077357 A1* | 3/2015 | Han | G06F 3/013 345/173 |

FOREIGN PATENT DOCUMENTS

| | | |
|---|---|---|
| CN | 102749990 A | 10/2012 |
| WO | 2013033842 A1 | 3/2013 |

* cited by examiner

*Primary Examiner* — Md Saiful A Siddiqui
(74) *Attorney, Agent, or Firm* — Leydig, Voit & Mayer, Ltd.

(57) ABSTRACT

Embodiments of the present invention provide a touch-control method, which is used for distinguishing a normal operation from a misoperation. The method provided by the embodiments of the present invention includes: receiving a touch instruction of a user; determining a user touch area corresponding to the touch instruction; determining whether a user observation area has an overlapping portion with the user touch area; and if the user observation area has an overlapping portion with the user touch area, responding to the touch instruction of the user. In the touch method provided by the embodiments of the present invention, a normal operation can be distinguished from a misoperation. The embodiments of the present invention further provide a related touch-control apparatus and terminal device.

17 Claims, 15 Drawing Sheets

TOUCH-CONTROL METHOD, RELATED APPARATUS, AND TERMINAL DEVICE

CROSS-REFERENCE TO RELATED APPLICATION

This application claims priority to Chinese Patent Application No. 201310746473.1, filed on Dec. 30, 2013, which is hereby incorporated by reference in its entirety.

TECHNICAL FIELD

The present invention relates to the touch-control field, and in particular, to a touch-control method, a related apparatus, and a terminal device.

BACKGROUND

As terminal devices become increasingly intelligent, a touch-control technology is developing rapidly. Compared with keystroke operations, for touch-control operations, smoother operation performance is smoother, available interfaces are more diversified, and screen space can be saved. Therefore, the touch-control technology is applied widely.

In the touch-control technology, a touchscreen of a terminal device is a user interface. A user may control the terminal device by using the touchscreen, but not in a conventional keystroke manner, and user experience is better.

However, there are also disadvantages when the touchscreen is used as a user interface. For example, when the user uses the terminal device, if the user touches the touchscreen carelessly, a misoperation may be easily triggered. However, because a touchscreen size is generally large, the user is likely to touch the screen when the user holds the terminal device and performs a touch-control operation. In the touch-control technology in a current phase, generally, all touch-control operations are considered as normal operations, and therefore, misoperations carelessly triggered by the user are unavoidable.

SUMMARY

A first aspect of an embodiment of the present invention provides a touch-control method, including:

receiving a touch instruction of a user;

determining a user touch area corresponding to the touch instruction;

determining whether a user observation area has an overlapping portion with the user touch area; and if the user observation area has an overlapping portion with the user touch area, responding to the touch instruction of the user.

According to the first aspect of the embodiment of the present invention, in a first implementation manner of the first aspect of the embodiment of the present invention, the method further includes:

storing, by a terminal device, a sample library, where the sample library stores at least one sample, where each sample includes a sample observation area, and a sample touch area, and sample interface information;

obtaining, by the terminal device, user interface information, where the user interface information is used to indicate characteristics of a current interface of the terminal device or functions of interface elements in a current interface;

if the user observation area does not have an overlapping portion with the user touch area, obtaining, by the terminal device, a target sample from the sample library, where a sample observation area of the target sample matches the user observation area, and sample interface information of the target sample matches the user interface information;

determining, by the terminal device, whether the user touch area matches a sample touch area of the target sample;

responding, by the terminal device, to the touch instruction if the user touch area matches the sample touch area of the target sample; and skipping responding, by the terminal device, to the touch instruction if the user touch area does not match the sample touch area of the target sample.

According to the first implementation manner of the first aspect of the embodiment of the present invention, in a second implementation manner of the first aspect of the embodiment of the present invention, the user interface information includes: luminance of the user interface, or the functions of the interface elements, or sizes of the interface elements, or locations of the interface elements in the interface of the terminal device, or a relationship between at least two interface elements.

According to the first implementation manner and the second implementation manner of the first aspect of the embodiment of the present invention, in a third implementation manner of the first aspect of the embodiment of the present invention, the method further includes:

obtaining, by the terminal device, user interaction information, where the user interaction information is used to indicate a situation of interaction between the terminal device and the user; and each sample in the sample library further includes sample interaction information; and the obtaining, by the terminal device, a target sample from the sample library, where a sample observation area of the target sample matches the user observation area, and sample interface information of the target sample matches the user interface information specifically includes:

obtaining, by the terminal device, the target sample from the sample library, where the sample observation area of the target sample matches the user observation area, and the sample interface information of the target sample matches the user interface information, and sample interaction information of the target sample matches the user interaction information.

According to the third implementation manner of the first aspect of the embodiment of the present invention, in a fourth implementation manner of the first aspect of the embodiment of the present invention, the situation of interaction includes: a user handholding mode, or a user posture, or a user motion status, or environmental luminance, or an environmental place, or an environmental time, or environmental interference.

According to any one of the first to the fourth implementation manners of the first aspect of the embodiment of the present invention, in a fifth implementation manner of the first aspect of the embodiment of the present invention, the method further includes:

determining, by the terminal device, a user touch gesture corresponding to the touch instruction; where the sample further includes a sample touch gesture;

the determining, by the terminal device, whether the user touch area matches a sample touch area of the target sample specifically includes: determining, by the terminal device, whether the user touch area matches the sample touch area of the target sample, and whether the user touch gesture matches a sample touch gesture of the target sample;

the responding, by the terminal device, to the touch instruction if the user touch area matches the sample touch area of the target sample specifically includes: if the user touch area matches the sample touch area of the target sample, and the user touch gesture matches the sample touch gesture of the target sample, responding, by the terminal device, to the touch instruction; and the skipping responding, by the terminal device, to the touch instruction if the user touch area does not match the sample touch area of the target sample specifically includes: if the user touch area does not match the sample touch area of the target sample, or the user touch gesture does not match the sample touch gesture of the target sample, skipping responding, by the terminal device, to the touch instruction.

According to any one of the first to the fifth implementation manners of the first aspect of the embodiment of the present invention, in a sixth implementation manner of the first aspect of the embodiment of the present invention, the method further includes:

obtaining, by the terminal device, feedback information of the user, where the feedback information is used to indicate whether the user accepts the response of the terminal device to the touch instruction; and updating, by the terminal device, the target sample according to the feedback information.

According to the sixth implementation manner of the first aspect of the embodiment of the present invention, in a seventh implementation manner of the first aspect of the embodiment of the present invention, the updating, by the terminal device, the target sample according to the feedback information, includes:

determining, by the terminal device, an accumulative value corresponding to the target sample;

if the feedback information indicates that the user accepts the response of the terminal device to the touch instruction, increasing, by the terminal device, the accumulative value;

if the feedback information indicates that the user does not accept the response of the terminal device to the touch instruction, decreasing, by the terminal device, the accumulative value; and if the accumulative value corresponding to the target sample is less than a preset value, deleting, by the terminal device, the target sample.

A second aspect of an embodiment of the present invention provides a touch-control apparatus, including:

a touch instruction module, configured to receive a touch instruction of a user;

a touch area module, configured to determine a user touch area corresponding to the touch instruction received by the touch instruction module;

a first determining module, configured to determine whether a user observation area has an overlapping portion with the user touch area; and a responding module, configured to respond to the touch instruction of the user when the first determining module determines that the user observation area has an overlapping portion with the user touch area.

According to the second aspect of the embodiment of the present invention, in a first implementation manner of the second aspect of the embodiment of the present invention, the touch apparatus further includes:

an interface information module, configured to obtain user interface information, where the user interface information is used to indicate characteristics of a current interface of the terminal device or functions of interface elements in a current interface;

a sample obtaining module, configured to obtain a target sample from a sample library of the terminal device when the first determining module determines that the user observation area does not have an overlapping portion with the user touch area, where a sample observation area of the target sample matches the user observation area, and sample interface information of the target sample matches the user interface information, where the sample library stores at least one sample, and each sample includes a sample observation area, and a sample touch area, and sample interface information; and a second determining module, configured to determine whether the user touch area matches a sample touch area of the target sample; where the responding module is specifically configured to respond to the touch instruction if the second determining module determines that the user touch area matches the sample touch area of the target sample, and skip responding to the touch instruction if the second determining module determines that the user touch area does not match the sample touch area of the target sample.

According to the first implementation manner of the second aspect of the embodiment of the present invention, in a second implementation manner of the second aspect of the embodiment of the present invention, the touch-control apparatus further includes:

an interaction information module, configured to obtain user interaction information, where the user interaction information is used to indicate a situation of interaction between the terminal device and the user; and in the sample library module, each sample in the sample library further includes sample interaction information; and the sample obtaining module is specifically configured to obtain the target sample from the sample library when the first determining module determines that the user observation area does not have an overlapping portion with the user touch-control area, where the sample observation area of the target sample matches the user observation area, and the sample interface information of the target sample matches the user interface information, and sample interaction information of the target sample matches the user interaction information.

According to the first implementation manner or the second implementation manner of the second aspect of the embodiment of the present invention, in a third implementation manner of the second aspect of the embodiment of the present invention, the touch-control apparatus further includes:

a touch gesture module, configured to determine a user touch gesture corresponding to the touch instruction; where in the sample library module, each sample in the sample library further includes a sample touch gesture;

the second determining module is specifically configured to determine whether the user touch area matches the sample touch area of the target sample, and determine whether the user touch gesture matches a sample touch gesture of the target sample; and the responding module is specifically configured to respond to the touch instruction if the second determining module determines that the user touch area matches the sample touch area of the target sample, and that the user touch gesture matches the sample touch gesture of the target sample, or skip responding to the touch instruction if the second determining module determines that the user touch area does not match the sample touch area of the target sample, or the second determining module determines that the user touch gesture does not match the sample touch gesture of the target sample.

According to any one implementation manner of the first to the third implementation manners of the second aspect of the embodiment of the present invention, in a fourth implementation manner of the second aspect of the embodiment of the present invention, the touch-control apparatus further includes:

a feedback information module, configured to obtain feedback information of the user, where the feedback information is used to indicate whether the user accepts the response of the responding module to the touch instruction; and a sample updating module, configured to update the target sample according to the feedback information.

According to the fourth implementation manner of the second aspect of the embodiment of the present invention, in a fifth implementation manner of the second aspect of the embodiment of the present invention, the sample updating module includes:

a numerical value unit, configured to determine an accumulative value corresponding to the target sample;

a calculating unit, specifically configured to increase the accumulative value when the user accepts the response of the responding module to the touch instruction, and decrease the accumulative value when the user does not accept the response of the responding module to the touch instruction;

a determining unit, configured to determine whether the accumulative value corresponding to the target sample is less than a preset value; and a deleting unit, configured to delete the target sample when a determining result of the determining unit is that the accumulative value corresponding to the target sample is less than the preset value.

A third aspect of an embodiment of the present invention provides a terminal device, including the second aspect of the present invention or any one of the first to the fifth implementation manners of the second aspect of the present invention. It can be seen from the foregoing technical solutions that the embodiments of the present invention have the following advantages:

In embodiments of the present invention, observation information of a user and a touch instruction of the user are obtained to determine whether a user observation area of the user has an overlapping portion with a user touch area, and if an overlapping portion exists, a response is made to the touch instruction of the user. When the user operates a terminal device, the user needs to observe an interface to determine whether to perform a touch operation. Therefore, the user touch area is generally located in the user observation area. Therefore, if the user observation area has an overlapping portion with the user touch area, which may indicate that the operation is not a misoperation, but an operation actively performed by the user when the user observes the interface of the terminal device, the terminal device may respond to the operation. In the embodiments of the present invention, by obtaining the observation information and touch instruction of the user and determining whether the user observation area has an overlapping portion with the user touch area, it can be determined whether an operation is a normal operation or a misoperation, which implements that a normal operation is distinguished from a misoperation.

DESCRIPTION OF EMBODIMENTS

Embodiments of the present invention provide a touch-control method, which is used for distinguishing a normal operation from a misoperation. The embodiments of the present invention further provide a related touch-control apparatus and a terminal device. The following provides a detailed description separately.

Figure 1:
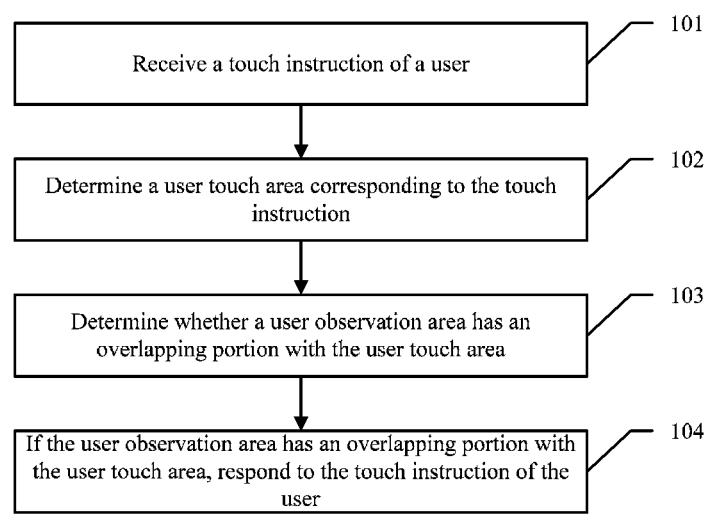
FIG. 1 is a flowchart of an embodiment of a touch-control method according to an embodiment of the present invention.

Referring to FIG. 1, a basic process of a touch-control method provided by an embodiment of the present invention mainly includes:

101. Receive a touch instruction of a user.

When the user uses a terminal device, the terminal device receives the touch instruction of the user. A gesture corresponding to the touch instruction may be a gesture, such as a tap, a slide, or a mid-air gesture, or may be another gesture, which is not limited herein.

The terminal device may obtain the touch instruction by using a touchscreen, or by using a camera, or by using a light sensor, or by using another approach, which is not limited herein.

Information included in the touch instruction includes a user touch area, or may further include a touch gesture, or may further include other information, which is not limited herein.

102. Determine a user touch area corresponding to the touch instruction.

The terminal device determines the user touch area corresponding to the touch instruction, where the user touch area includes a size and location of the user touch area.

The size of the touch area is not limited in the embodiment. For example, when the user touches the terminal device with a palm, the user touch area is large; and when the user touches the terminal device with a finger tip, the user touch area is small.

The location of the user touch area in the terminal device is not limited in the embodiment.

103. Determine whether a user observation area has an overlapping portion with the user touch area.

The terminal device obtains the user observation area, where the user observation area indicates an area within which a line of sight falls, in an interface of the terminal device, when the user observes the terminal device. The terminal device obtains the user observation area by using many methods, for example, by using a front-facing camera or a near infrared camera, or may obtain the user observation area by using another approach, which is not limited herein.

Generally, an operation habit of a user is: looking at an operation object with eyes, and operating an operation object with a hand. Therefore, if a touch instruction received by the terminal device is not a misoperation, a user touch area corresponding to the touch instruction should have an overlapping portion with the user observation area. Therefore, in this embodiment, after obtaining the user observation area, the terminal device determines whether the user observation area has an overlapping portion with the user touch area. If the user observation area has an overlapping portion with the user touch area, it is considered that the touch operation performed by the user on the terminal device is not a misoperation, and the touch instruction is valid.

There are many criteria for determining whether the user observation area has an overlapping portion with the user touch area by the terminal device, including: the terminal device determines whether all the user touch area is included in the user observation area, or the terminal device determines whether a center point of the user touch area is included in the user observation area, or the terminal device determines whether more than half of a size of the user touch area is included in the user observation area. There may also be other determining criteria for determining whether the user observation area has an overlapping portion with the user touch area by the terminal device, which are not limited herein.

104. If the user observation area has an overlapping portion with the user touch area, respond to the touch instruction of the user.

If the terminal device determines that the user observation area has an overlapping portion with the user touch area, it is considered that the touch operation performed by the user on the terminal device is not a misoperation, and the touch instruction is valid. Therefore, the terminal device responds to the touch instruction of the user.

In the touch-control method provided in this embodiment, a terminal device obtains observation information of a user and a touch instruction of the user, and further determines whether a user observation area has an overlapping portion with a user touch area, and if the user observation area has an overlapping portion with the user touch area, responds to the touch instruction of the user. When the user operates the terminal device, the user needs to observe an interface to determine whether to perform a touch operation. Therefore, the user touch area is generally located in the user observation area. Therefore, if the user observation area has an overlapping portion with the user touch area, which may indicate that the operation is not a misoperation, but an operation actively performed by the user when the user observes the interface of the terminal device, the terminal device may respond to the operation. In this embodiment, by obtaining the observation information and touch instruction of the user and determining whether the user observation area has an overlapping portion with the user touch area, it can be determined whether an operation is a normal operation or a misoperation, which implements that a normal operation is distinguished from a misoperation.

In the foregoing embodiment shown in FIG. 1, when the terminal device determines that the user observation area has an overlapping portion with the user touch area, the terminal device responds to the touch instruction. In an actual application, the user observation area may also not have an overlapping portion with the user touch area. In view of this, the present invention provides another embodiment. For details about a basic process of the embodiment, reference may be made to FIG. 2.

201. A terminal device receives a touch instruction of a user.

202. The terminal device determines a user touch area corresponding to the touch instruction.

203. The terminal device determines, according to the touch instruction and observation information, whether a user observation area has an overlapping portion with the user touch area.

Steps 201 to 203 are basically the same as steps 101 to 103, and are not repeatedly described herein.

If in step 203, the terminal device determines that the user observation area has an overlapping portion with the user touch area, step 204 is performed; and if the terminal device determines that the user observation area does not have an overlapping portion with the user touch area, step 205 is performed.

204. The terminal device responds to the touch instruction of the user.

Step 204 is basically the same as step 104, and is not repeatedly described herein.

205. The terminal device obtains user interface information.

The terminal device obtains the user interface information of the user, where the user interface information is used to indicate:

characteristics of a current interface of the terminal device, including luminance of the user interface of the terminal device, or sizes of interface elements, for example, a font size, or locations of interface elements in the interface of the terminal device, or a relationship between at least two interface elements;

or functions of interface elements in a current interface, for example, a web link or a functional key.

The user interface information may also include other characteristics of the current interface or functions of interface elements in the current interface, which is not limited herein.

206. The terminal device obtains a target sample from a sample library.

The terminal device stores a sample library. The sample library stores at least one sample, where each sample includes a sample observation area, and a sample touch area, and sample interface information.

The sample observation area corresponds to a preset area in a display interface of the terminal device. The sample interface information corresponds to preset characteristics of the interface of the terminal device or preset functions of the interface elements. The sample touch area corresponds to a preset area on a touchscreen of the terminal device. A sample touch area of any sample in the sample library does not necessarily overlap a sample observation area of the sample.

Any sample in the sample library satisfies that: when the user observation area matches a sample observation area of the sample, and the user interface information matches sample interface information of the sample, any touch instruction received in the sample touch area of the sample is considered as a normal operation instruction by the terminal device.

The terminal device obtains the target sample from the sample library, where a sample observation area of the target sample matches the user observation area, and sample interface information of the target sample matches the user interface information.

There are many criteria for determining whether the sample observation area matches the user observation area including: all the user observation area is included in the sample observation area, or a center point of the user observation area is included in the sample observation area, or more than half of a size of the user observation area is included in the user observation area. There may also be other determining criteria, which is not limited herein.

There are many criteria for determining whether the sample interface information matches the user interface information, including: interface element types indicated by the user interface information are the same as interface element types indicated by the sample interface information, locations of the interface elements indicated by the user interface information, in the terminal device, are the same as locations of interface elements indicated by the sample interface information, in the terminal device, or a relationship between multiple interface elements indicated by the user interface information are the same as a relationship between multiple interface elements indicated by the sample interface information. There may also be other criteria for determining whether the sample interface information matches the user interface information, which is not limited herein.

207. The terminal device determines whether the user touch area matches a sample touch area of the target sample.

After obtaining the target sample from the sample library, the terminal device determines whether the user touch area matches the sample touch area of the target sample.

There are many criteria for determining whether the user touch area matches the sample touch area of the target sample by the terminal device, including: the terminal device determines whether all the user touch area is included in the sample touch area of the target sample, or the terminal device determines whether a center point of the user touch area is included in the sample touch area of the target sample, or the terminal device determines whether more than half of a size of the user touch area is included in the sample touch area of the target sample. There may also be other determining criteria for determining whether the user touch area matches the sample touch area of the target sample by the terminal device, which is not limited herein.

If the terminal device determines that the user touch area matches the sample touch area of the target sample, step 208 is performed; and if the terminal device determines that the user touch area does not match the sample touch area of the target sample, step 209 is performed.

208. The terminal device responds to the touch instruction.

If the terminal device determines that the user touch area matches the sample touch area of the target sample, it indicates that the touch instruction is a normal operation instruction, and therefore, the terminal device responds to the touch instruction.

209. The terminal device does not respond to the touch instruction.

If the terminal device determines that the user touch area does not match the sample touch area of the target sample, it indicates that the touch instruction is a misoperation instruction, and therefore, the terminal device does not respond to the touch instruction.

If step 205 is performed after step 204, when the terminal device determines that the user observation area has an overlapping portion with the user touch area in step 203, the terminal device directly responds to the touch instruction, and does not perform step 205, and an operation step may be saved. However, step 205 may also be performed before any one of steps 201 to 204, which is not limited in this embodiment.

In the touch-control method provided in this embodiment, if a terminal device determines that a user observation area does not have an overlapping portion with a user touch area, the terminal device obtains a target sample from a sample library, and determines, according to the target sample, whether to respond to a touch instruction. The method provided in this embodiment specifically solves a problem of how to distinguish a normal operation from a misoperation when the user observation area does not have an overlapping portion with the user touch area. When a user operates the terminal device, the user touch area is not located in the user observation area due to a personal habit, a program requirement, and so on, even if a normal operation is performed. In the method provided in this embodiment, by determining whether a user touch area matches a sample touch area, it is determined whether a touch instruction is a normal operation instruction, which implements that a normal operation is distinguished from a misoperation.

Figure 2:
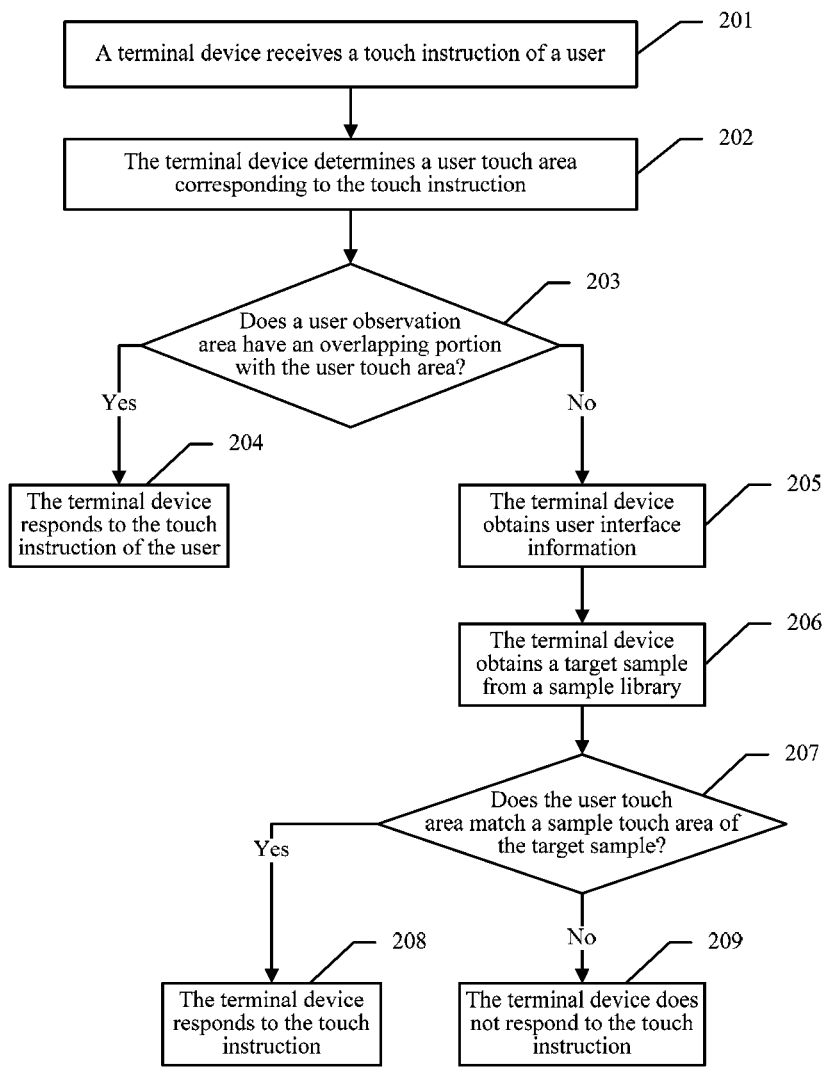
FIG. 2 is a flowchart of another embodiment of a touch-control method according to an embodiment of the present invention.
Figure 3:
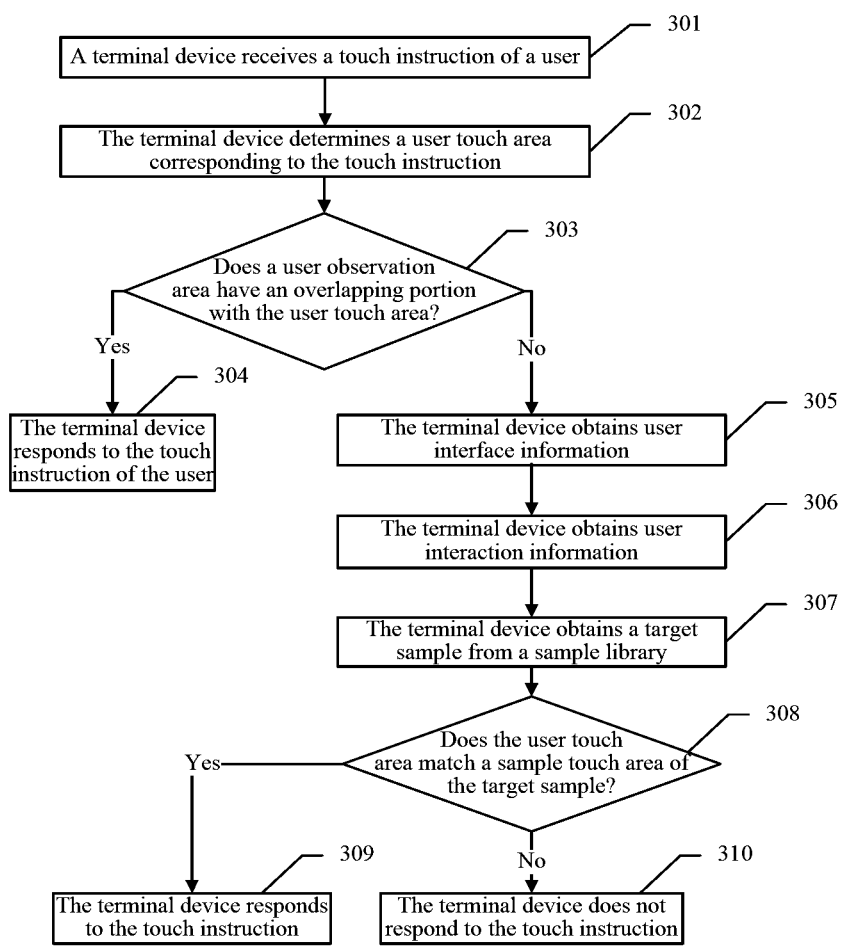
FIG. 3 is a flowchart of another embodiment of a touch-control method according to an embodiment of the present invention.

The foregoing embodiment shown in FIG. 2 provides a method for determining, according to a sample, whether to respond to a touch instruction, where a terminal device obtains a target sample by using a user observation area and user interface information. The following embodiment provides a method for obtaining a target sample more accurately. Referring to FIG. 3, a basic process of the method includes:

301. A terminal device receives a touch instruction of a user.

302. The terminal device determines a touch area corresponding to the touch instruction.

303. The terminal device determines whether an observation area has an overlapping portion with the touch area.

Steps 301 to 303 are basically the same as steps 201 to 203, and are not repeatedly described herein.

If in step 303, the terminal device determines that the user observation area has an overlapping portion with the user touch area, step 304 is performed; if the terminal device determines that the user observation area does not have an overlapping portion with the user touch area, step 305 is performed.

304. The terminal device responds to the touch instruction of the user.

Step 304 is basically the same as step 204, and is not repeatedly described herein.

305. The terminal device obtains user interface information.

Step 305 is basically the same as step 205, and is not repeatedly described herein.

306. The terminal device obtains user interaction information.

The terminal device obtains the user interaction information, where the user interaction information is used to indicate a situation of interaction between the terminal device and the user. The situation of interaction includes: a user handholding mode, or a user posture, or a user motion status, or environmental luminance, or an environmental place, or an environmental time, or environmental interference, and may also include other content, which is not limited herein.

The terminal device obtains the user interaction information in many manners, including: by using a touchscreen, by using a front-facing camera, by using a sensor, or by using another approach, which is not limited herein.

307. The terminal device obtains a target sample from a sample library.

The terminal device stores a sample library. The sample library stores at least one sample, where each sample includes a sample observation area, and a sample touch area, and sample interface information, and sample interaction information.

Meanings of the sample observation area, sample touch area, and sample interface information are basically the same as those in step 206, and are not repeatedly described herein. The sample interaction information corresponds to the situation of interaction between the terminal device and the user.

Any sample in the sample library satisfies that: when the user observation area matches a sample observation area of the sample, and the user interface information matches sample interface information of the sample, and the user interaction information matches sample interaction information of the sample, any touch instruction received in the sample touch area of the sample is considered as a normal operation instruction by the terminal device.

The terminal device obtains the target sample from the sample library, where a sample observation area of the target sample matches the user observation area, and sample interface information of the target sample matches the user interface information, and sample interaction information of the target sample matches the user interaction information.

Criteria for determining whether the sample observation area matches the user observation and criteria for determining whether the sample interface information matches the user interface information are similar to those described in step 206, and are not repeatedly described herein. There are many criteria for determining whether the sample interaction information matches the user interaction information, including: a handhold mode corresponding to the sample interaction information is the same as the user handholding mode corresponding to the user interaction information, or an operation posture corresponding to the sample interaction information is the same as the user posture corresponding to the user interaction information, or preset luminance corresponding to the sample interaction information is the same as the environmental luminance corresponding to the user interaction information. There may also be other criteria for determining whether the sample interaction information matches the user interaction information, which are not limited herein.

308. The terminal device determines whether the user touch area matches a sample touch area of the target sample.

There are many criteria for determining whether the user touch area matches the sample touch area of the target sample by the terminal device, which are basically the same as those in step 207, and are not repeatedly described herein.

If the terminal device determines that the user touch area matches the sample touch area of the target sample, step 309 is performed; and if the terminal device determines that the user touch area does not match the sample touch area of the target sample, step 310 is performed.

309. The terminal device responds to the touch instruction.

310. The terminal device does not respond to the touch instruction.

Steps 309 and 310 are basically the same as steps 208 and 209, and are not repeatedly described herein.

If step 305 is performed after step 304, when the terminal device determines that the user observation area has an overlapping portion with the user touch area in step 303, the terminal device directly responds to the touch instruction, and does not perform step 305, and an operation step may be saved. However, step 305 may also be performed before any one of steps 301 to 304, which is not limited in this embodiment.

If step 306 is performed after step 305, when the terminal device determines that the user observation area has an overlapping portion with the user touch area in step 303, the terminal device directly responds to the touch instruction, and does not perform step 306, and an operation step may be saved. However, step 306 may also be performed before any one of steps 301 to 305, which is not limited in this embodiment.

This embodiment, on a basis of the embodiment shown in FIG. 2, provides a touch-control method, where it is determined, according to a target sample obtained from a sample library, whether to respond to a touch instruction. When the target sample is obtained from the sample library, not only a sample observation area of the target sample matches a user observation area, and sample interface information of the target sample matches user interface information, but also sample interaction information of the target sample needs to match user interaction information. In this embodiment, because determining whether the user interaction information matches the sample interaction information is added, the obtained target sample is closer to a situation of interaction with a terminal device when a user actually uses the terminal device, and further, a determination, which is made according to the sample, about whether to respond to the touch instruction is also closer to the situation of interaction between the user and the terminal device, and a normal operation is distinguished from a misoperation more accurately.

Figure 4:
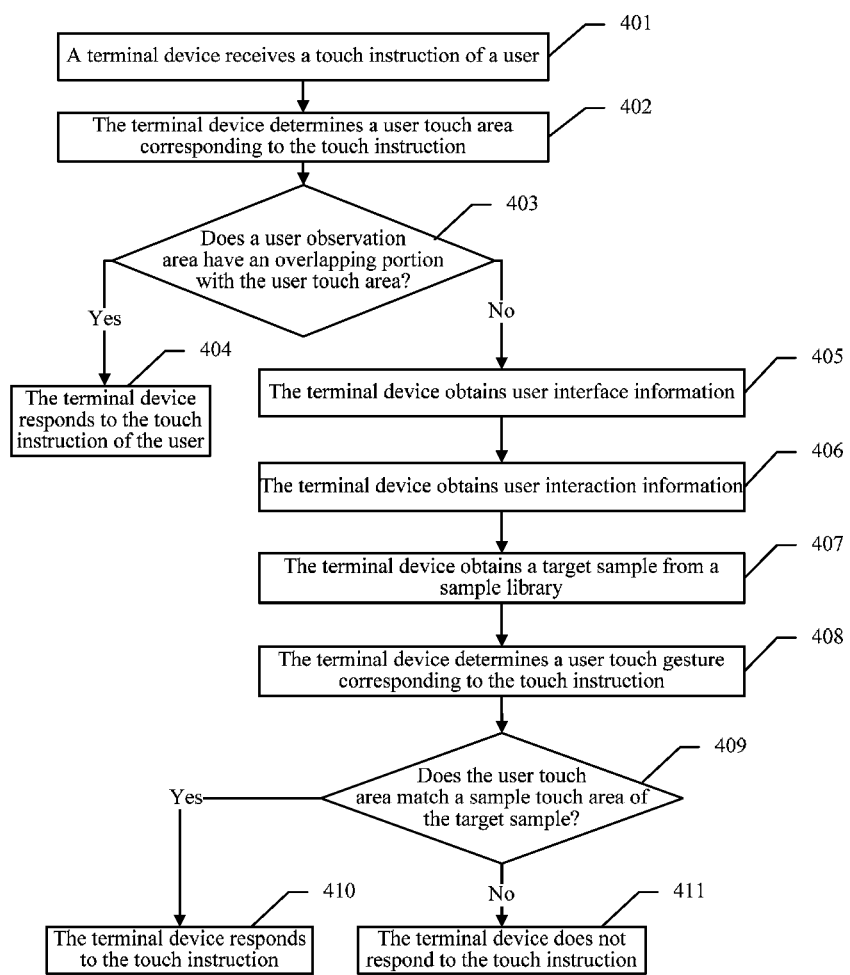
FIG. 4 is a flowchart of another embodiment of a touch-control method according to an embodiment of the present invention.

In the foregoing embodiment shown in FIG. 3, when obtaining the target sample from the sample library, the terminal device needs to make reference to the sample interaction information parameter, so that the obtained sample is closer to the situation of interaction between the user and the terminal device. In the following embodiment, a determining parameter is added in the case that it is determined whether to respond to a touch instruction, so as to improve accuracy of a determining result. Referring to FIG. 4, a basic process of the method includes:

401. A terminal device receives a touch instruction of a user.

402. The terminal device determines a touch area corresponding to the touch instruction.

403. The terminal device determines whether an observation area has an overlapping portion with the touch area.

Steps 401 to 403 are basically the same as steps 301 to 303, and are not repeatedly described herein.

If in step 403, the terminal device determines that the user observation area has an overlapping portion with the user touch area, step 404 is performed; if the terminal device determines that the user observation area does not have an overlapping portion with the user touch area, step 405 is performed.

404. The terminal device responds to the touch instruction of the user.

405. The terminal device obtains user interface information.

406. The terminal device obtains user interaction information.

Steps 404 to 406 are basically the same as steps 304 to 306, and are not repeatedly described herein.

407. The terminal device obtains a target sample from a sample library.

The terminal device stores a sample library. The sample library stores at least one sample, where each sample includes a sample observation area, and a sample touch area, and sample interface information, and sample interaction information, and a sample touch gesture.

Meanings of the sample observation area, sample touch area, sample interface information, and sample interaction information are basically the same as those in step 307, and are not repeatedly described herein. The sample touch gesture corresponds to a preset touch gesture.

The terminal device obtains the target sample from the sample library, where a sample observation area of the target sample matches the user observation area, and sample interface information of the target sample matches the user interface information, and sample interaction information of the target sample matches the user interaction information.

408. The terminal device determines a user touch gesture corresponding to the touch instruction.

The terminal device determines the user touch gesture corresponding to the received touch instruction. Touch gestures are in many forms, including touch forms, such as a tap, a double tap, a touch and hold, a slide, and a mid-air gesture, and also including operation forms performed by different parts of a human body, such as a single-finger operation, a multi-finger operation, and a palm operation, which is not limited herein.

409. The terminal device determines whether the user touch area matches a sample touch area of the target sample, and whether the user touch gesture matches a sample touch gesture of the target sample.

Criteria for determining whether the user touch area matches the sample touch area of the target sample by the terminal device are basically the same as those in step 308, and are not repeatedly described herein.

There are many criteria for determining whether the user touch gesture matches the sample touch gesture of the target sample by the terminal device, including: the terminal device determines whether a touch form of the user touch gesture is the same as a touch form of the sample touch gesture, and/or the terminal device determines whether an operation subject corresponding to the user touch gesture and an operation subject corresponding to the sample touch gesture are a same part of the human body. There may also be other determining criteria, which is not limited herein.

If the terminal device determines that the user touch area matches the sample touch area of the target sample, and that the user touch gesture matches the sample touch gesture of the target sample, step 410 is performed.

If the terminal device determines that the user touch area does not match the sample touch area of the target sample, or that the user touch gesture does not match the sample touch gesture of the target sample, step 411 is performed.

410. The terminal device responds to the touch instruction.

411. The terminal device does not respond to the touch instruction.

Steps 410 and 411 are basically the same as steps 309 and 310, and are not repeatedly described herein.

If step 405 is performed after step 404, when the terminal device determines that the user observation area has an overlapping portion with the user touch area in step 403, the terminal device directly responds to the touch instruction, and does not perform step 405, and an operation step may be saved. However, step 405 may also be performed before any one of steps 401 to 404, which is not limited in this embodiment.

If step 406 is performed after step 405, when the terminal device determines that the user observation area has an overlapping portion with the user touch area in step 403, the terminal device directly responds to the touch instruction, and does not perform step 406, and an operation step may be saved. However, step 406 may also be performed before any one of steps 401 to 405, which is not limited in this embodiment.

If step 408 is performed after step 407, when the terminal device determines that the user observation area has an overlapping portion with the user touch area in step 403, the terminal device directly responds to the touch instruction, and does not perform step 406, and an operation step may be saved. However, step 408 may also be performed before any one of steps 402 to 407, which is not limited in this embodiment.

Step 406 may be omitted. If step 406 is omitted, any sample in the sample library does not need to include sample interaction information, and when the terminal device obtains the target sample from the sample library in step 407, the sample interaction information of the target sample does not need to match the user interaction information.

This embodiment, on a basis of the embodiment shown in FIG. 3, provides a touch-control method, where it is determined, according to a target sample obtained from a sample library, whether to respond to a touch instruction. When determining whether to respond to a touch instruction, a terminal device not only determines whether a user touch area matches a sample touch area of a target sample, but also determines whether a user touch gesture matches a sample touch gesture of the target sample. Only in a case in which the terminal device determines that the user touch area matches the sample touch area of the target sample, and that the user touch gesture matches the sample touch gesture of the target sample, the terminal device considers that the touch instruction is a touch instruction of a normal operation and makes a response. Compared with the foregoing embodiment in which the terminal device only determines whether a user touch area matches a sample touch area of a target sample, a determining result in this embodiment is more accurate because a determining parameter is added.

Figure 5:
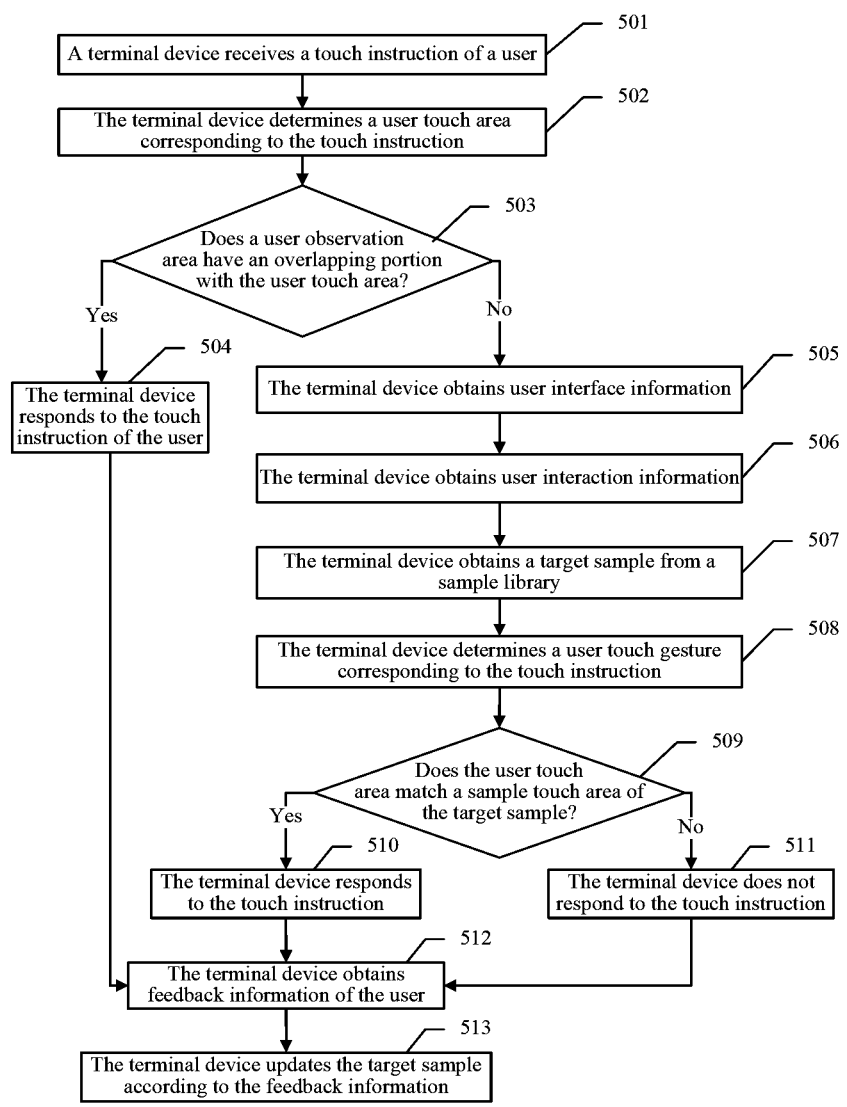
FIG. 5 is a flowchart of another embodiment of a touch-control method according to an embodiment of the present invention.

In the foregoing embodiments shown in FIG. 2 to FIG. 4, the terminal device obtains a target sample from a sample library, and determines, according to the target sample, whether to respond to an operation instruction. On this basis, the following embodiment provides another touch-control method, which may ensure timeliness of the sample library. Referring to FIG. 5, a basic flowchart of the method includes:

501. A terminal device receives a touch instruction of a user.

502. The terminal device determines a touch area corresponding to the touch instruction.

503. The terminal device determines whether an observation area has an overlapping portion with the touch area.

Steps 501 to 503 are basically the same as steps 401 to 403, and are not repeatedly described herein.

If in step 503, the terminal device determines that the user observation area has an overlapping portion with the user touch area, step 504 is performed; if the terminal device determines that the user observation area does not have an overlapping portion with the user touch area, step 505 is performed.

504. The terminal device responds to the touch instruction of the user.

505. The terminal device obtains user interface information.

506. The terminal device obtains user interaction information.

507. The terminal device obtains a target sample from a sample library.

508. The terminal device determines a user touch gesture corresponding to the touch instruction.

509. The terminal device determines whether the user touch area matches a sample touch area of the target sample, and whether the user touch gesture matches a sample touch gesture of the target sample.

Steps 504 to 509 are basically the same as steps 404 to 409, and are not repeatedly described herein.

If in step 509, the terminal device determines that the user touch area matches the sample touch area of the target sample, and that the user touch gesture matches the sample touch gesture of the target sample, step 510 is performed.

If the terminal device determines that the user touch area does not match the sample touch area of the target sample, or that the user touch gesture does not match the sample touch gesture of the target sample, step 511 is performed.

510. The terminal device responds to the touch instruction.

511. The terminal device does not respond to the touch instruction.

Steps 510 and 511 are basically the same as steps 410 and 411, and are not repeatedly described herein.

512. The terminal device obtains feedback information of the user.

The terminal device obtains the feedback information of the user, where the feedback information is used to indicate whether the user accepts the response of the terminal device to the touch instruction. For example, when the terminal device determines not to respond to a touch instruction, but the user inputs the touch instruction repeatedly, it indicates that the user does not accept that the terminal device does not respond to the touch instruction; or when the terminal device responds to a touch instruction, but the user actively rolls back the terminal device to a state before the response to the instruction is made, it indicates that the user does not accept the response of the terminal device to the touch instruction.

The terminal device obtains the feedback information of the user by using many methods, including: the terminal device obtains the feedback information of the user by using a touchscreen, or the terminal device obtains the feedback information of the user by using a front-facing camera. The terminal device may also obtain the feedback information of the user by using other methods, which is not limited herein.

513. The terminal device updates the target sample according to the feedback information.

After obtaining the feedback information of the user, the terminal device updates the target sample according to the feedback information. There are many methods for updating the target sample, which are described in detail in the following embodiment and are not limited herein.

Step 505 may also be performed before any one of steps 501 to 504, which is not limited in this embodiment.

Step 506 may also be performed before any one of steps 501 to 505, which is not limited in this embodiment.

Step 508 may also be performed before any one of steps 502 to 507, which is not limited in this embodiment.

Step 506 may be omitted. If step 506 is omitted, any sample in the sample library does not need to include sample interaction information, and when the terminal device obtains the target sample from the sample library in step 507, the sample interaction information of the target sample does not need to match the user interaction information.

Step 508 may be omitted. If step 508 is omitted, any sample in the sample library does not need to include a sample touch gesture, and the terminal device does not need to determine whether the user touch gesture matches the sample touch gesture of the target sample in step 509.

This embodiment, on a basis of the embodiments shown in FIG. 2 to FIG. 4, provides a touch-control method, where a terminal device determines, according to a target sample obtained from a sample library, whether to respond to a touch instruction. In addition, the terminal device also obtains feedback information of a user, and further updates the target sample in the sample library. Compared with the foregoing embodiment, in this embodiment, the target sample may be updated according to the feedback of the user, which ensures timeliness of the sample library, so that samples in the sample library are more compliant with a use habit of the user.

Figure 6A:
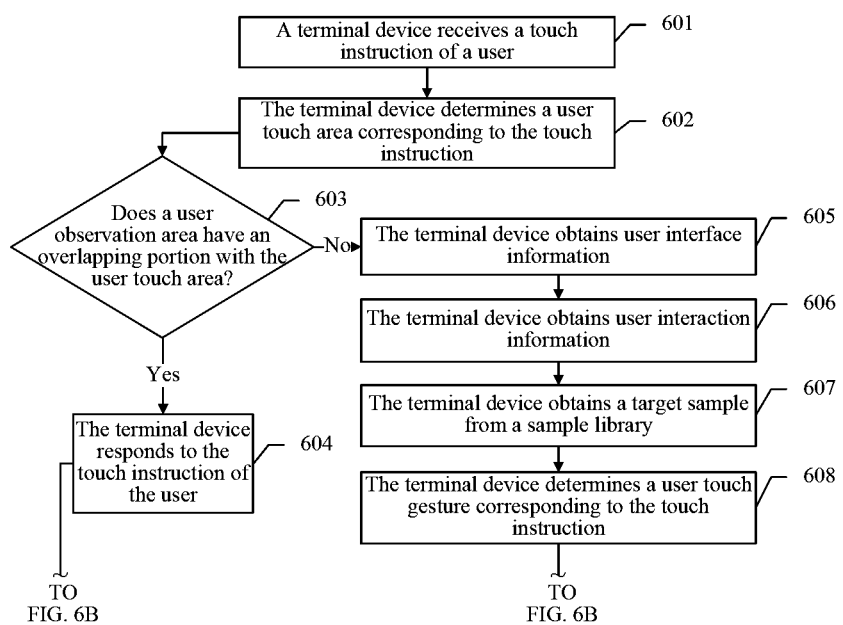
FIG. 6A and FIG. 6B are a flowchart of another embodiment of a touch-control method according to an embodiment of the present invention.
Figure 6B:
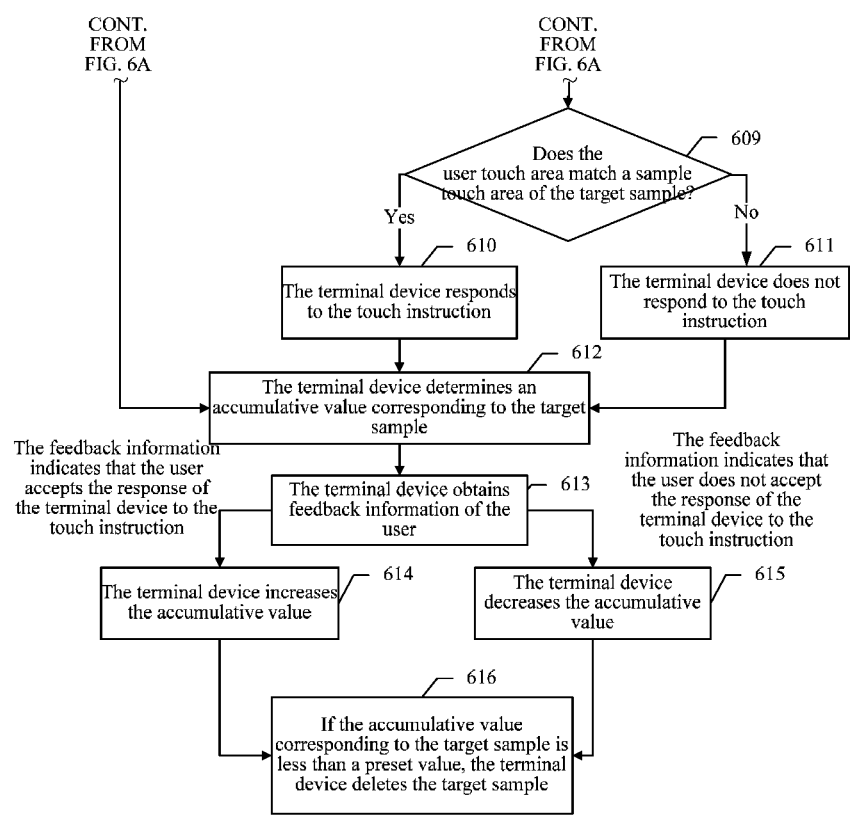

The foregoing embodiment shown in FIG. 5 provides a touch-control method, where a terminal device updates a target sample according to feedback information of a user, which ensures timeliness of a sample library. The following embodiment provides a specific method for updating a target sample. Referring to FIG. 6A and FIG. 6B, a basic process of the method includes:

601. A terminal device receives a touch instruction of a user.

602. The terminal device determines a touch area corresponding to the touch instruction.

603. The terminal device determines whether an observation area has an overlapping portion with the touch area.

Steps 601 to 603 are basically the same as steps 501 to 503, and are not repeatedly described herein.

If in step 603, the terminal device determines that the user observation area has an overlapping portion with the user touch area, step 604 is performed; if the terminal device determines that the user observation area does not have an overlapping portion with the user touch area, step 605 is performed.

604. The terminal device responds to the touch instruction of the user.

605. The terminal device obtains user interface information.

606. The terminal device obtains user interaction information.

607. The terminal device obtains a target sample from a sample library.

608. The terminal device determines a user touch gesture corresponding to the touch instruction.

609. The terminal device determines whether the user touch area matches a sample touch area of the target sample, and whether the user touch gesture matches a sample touch gesture of the target sample.

Steps 604 to 609 are basically the same as steps 504 to 509, and are not repeatedly described herein.

If in step 609, the terminal device determines that the user touch area matches the sample touch area of the target sample, and that the user touch gesture matches the sample touch gesture of the target sample, step 610 is performed.

If the terminal device determines that the user touch area does not match the sample touch area of the target sample, or that the user touch gesture does not match the sample touch gesture of the target sample, step 611 is performed.

610. The terminal device responds to the touch instruction.

611. The terminal device does not respond to the touch instruction.

Steps 610 and 611 are basically the same as steps 510 and 511, and are not repeatedly described herein.

612. The terminal device determines an accumulative value corresponding to the target sample.

In this embodiment, each sample in the sample library corresponds to an accumulative value. The accumulative value is a numeric value, and an initial value of the accumulative value may be set by the terminal device by default or set by the user, and the accumulative value may be increased or decreased by the terminal device.

In this step, the terminal device determines the accumulative value of the target sample.

613. The terminal device obtains feedback information of the user.

The terminal device obtains the feedback information of the user, where the feedback information is used to indicate whether the user accepts the response of the terminal device to the touch instruction. The method for obtaining the feedback information of the user by the terminal device is basically the same as step 512, and is not repeatedly described herein.

If the feedback information indicates that the user accepts the response of the terminal device to the touch instruction, step 614 is performed.

If the feedback information indicates that the user does not accept the response of the terminal device to the touch instruction, step 615 is performed.

614. The terminal device increases the accumulative value.

If the feedback information indicates that the user accepts the response of the terminal device to the touch instruction, the terminal device increases the accumulative value. Increasing the accumulative value by the terminal device may be adding 1 to the accumulative value, or may be adding a numeric value of another magnitude to the accumulative value, which is not limited herein.

615. The terminal device decreases the accumulative value.

If the feedback information indicates that the user does not accept the response of the terminal device to the touch instruction, the terminal device decreases the accumulative value. Decreasing the accumulative value by the terminal device may be subtracting 1 from the accumulative value, or may be subtracting a numeric value of another magnitude from the accumulative value, which is not limited herein.

616. If the accumulative value corresponding to the target sample is less than a preset value, the terminal device deletes the target sample.

In this embodiment, a preset value is set in the terminal device. The preset value may be set by the terminal device by default, or may be set by the user, or may be obtained by using another approach, which is not limited herein. When an accumulative value corresponding to a sample is less than the preset value, it indicates that because a determination, which is made by the terminal device according to the sample, about whether to respond to the touch instruction, is not accepted by the user, and the sample is not compliant with a use habit of the user, the terminal device deletes the target sample.

It can be understood that, because the sample library stores at least one sample, an initial value of an accumulative value corresponding to any sample in the sample library should be greater than the preset value in this step.

Step 605 may also be performed before any one of steps 601 to 604, which is not limited in this embodiment.

Step 606 may also be performed before any one of steps 601 to 605, which is not limited in this embodiment.

Step 608 may also be performed before any one of steps 602 to 607, which is not limited in this embodiment.

Step 606 may be omitted. If step 606 is omitted, any sample in the sample library does not need to include sample interaction information, and when the terminal device obtains the target sample from the sample library in step 607, the sample interaction information of the target sample does not need to match the user interaction information.

Step 608 may be omitted. If step 608 is omitted, any sample in the sample library does not need to include a sample touch gesture, and the terminal device does not need to determine whether the user touch gesture matches the sample touch gesture of the target sample in step 609.

Step 612 may be performed before any one of step 608 to step 611, or may be performed after step 613 and before step 614, which is not limited in this embodiment.

This embodiment provides a specific method for updating a target sample by a terminal device. An accumulative value corresponding to a target sample is determined, and accumulation is performed for the accumulative value according to feedback information of a user, and finally, a sample with an accumulative value less than a preset value is deleted, which implements updating of the target sample. In this embodiment, samples that are not compliant with a use habit of the user may be deleted continuously, to ensure timeliness of a sample library.

To make the foregoing embodiment comprehensible, the following uses a specific application scenario as an example for description.

A user browses a webpage by using a mobile phone. In the browsing process, a finger of the user touches an advertisement link on the left of the webpage. The mobile phone receives a touch instruction sent by the user by touching the advertisement link.

The mobile phone obtains a touch area corresponding to the touch instruction, where the touch area is located on the left of a touchscreen of the mobile phone. However, after taking a photo by using a front-facing camera and making analysis, the mobile phone learns that a line of sight of the user focuses on the center of the touchscreen of the mobile phone, and does not overlap the touch area.

The mobile phone obtains current interface information, where the interface information includes that: the advertisement link is on the left of the interface, webpage text is in the middle part of the interface, and functional menus of the webpage are in the upper part of the interface.

The mobile phone obtains current interaction information, where the interaction information includes that: the user holds the mobile phone with both hands.

A user touch mode obtained by the mobile phone is a tap with a left thumb.

The mobile phone obtains a target sample from a model library stored in a memory of the mobile phone. Information in the sample includes that: a user observation area is located in the center of the touchscreen; the advertisement link is on the left of the current interface, webpage text is in the middle part, and functional menus of the webpage are in the upper part; currently, the user holds the mobile phone with both hands; a sample touch area is an area except the advertisement link on the left; a sample touch gesture is a slide by any finger or a tap by a right forefinger; and an accumulative value corresponding to the sample is 101.

The mobile phone determines that the user touch area does not have an overlapping portion with the sample touch area of the target sample, and that the user touch mode is also not included in the sample touch gesture of the target sample. Therefore, the mobile phone does not respond to the touch operation of the user.

Then, the user touches the advertisement information repeatedly, and the mobile phone considers that a purpose of the repeated operation of the user is to open the advertisement information. Therefore, the mobile phone receives the touch instruction of the user, and subtracts 2 from the accumulative value to obtain a new accumulative value 99.

A preset value in the mobile phone is 100. Because the new accumulative value 99 is less than 100, the mobile phone deletes the target sample.

Figure 7:
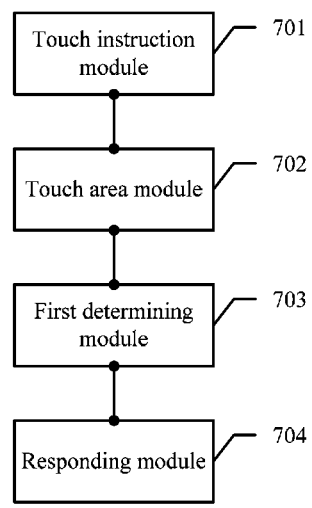
FIG. 7 is a structural diagram of an embodiment of a touch-control apparatus according to an embodiment of the present invention.

An embodiment of the present invention further provides a touch-control apparatus, which is used for distinguishing a normal operation from a misoperation. Referring to FIG. 7, a basic structure of the touch-control apparatus provided by the embodiment of the present invention includes:

a touch instruction module 701, configured to receive a touch instruction of a user;

a touch area module 702, configured to determine a user touch area corresponding to the touch instruction received by the touch instruction module;

a first determining module 703, configured to determine, according to the touch instruction and observation information, whether a user observation area has an overlapping portion with the user touch area, where the observation information is used to indicate a user observation area for observing a display interface of a terminal device by the user; and a responding module 704, configured to respond to the touch instruction of the user when the first determining module determines that the user observation area has an overlapping portion with the user touch area.

In the touch-control apparatus provided in this embodiment, a touch instruction module 701 obtains a touch instruction of a user; then a touch area module 702 obtains a user touch area; further, a first determining module 703 determines whether a user observation area has an overlapping portion with the user touch area; and if the user observation area has an overlapping portion with the user touch area, a responding module 704 responds to the touch instruction of the user. When the user operates a terminal device, the user needs to observe an interface to determine whether to perform a touch operation. Therefore, the user touch area is generally located in the user observation area. Therefore, if the user observation area has an overlapping portion with the user touch area, which may indicate that the operation is not a misoperation, but an operation actively performed by the user when the user observes the interface of the terminal device, the terminal device may respond to the operation. In this embodiment, by obtaining the observation information and touch instruction of the user and determining whether the user observation area has an overlapping portion with the user touch area, it can be determined whether an operation is a normal operation or a misoperation, which implements that a normal operation is distinguished from a misoperation.

Figure 8:
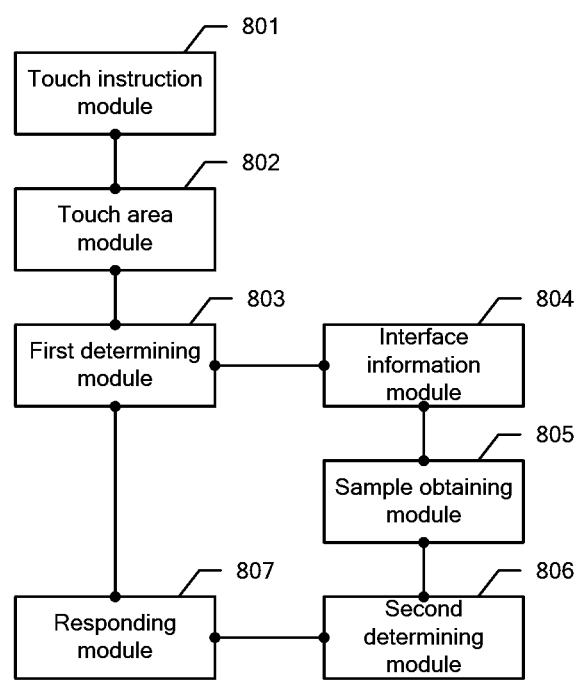
FIG. 8 is a structural diagram of another embodiment of a touch-control apparatus according to an embodiment of the present invention.

In the foregoing embodiment shown in FIG. 7, when the first determining module 703 determines that the user observation area has an overlapping portion with the user touch area, the responding module 704 responds to the touch instruction. However, in an actual application, the user observation area may also not overlap the user touch area. The following embodiment provides another touch-control apparatus for this case. Referring to FIG. 8, a basic structure of this apparatus includes:

a touch instruction module 801, configured to receive a touch instruction of a user;

a touch area module 802, configured to determine a user touch area corresponding to the touch instruction received by the touch instruction module;

a first determining module 803, configured to determine, according to the touch instruction and observation information, whether a user observation area has an overlapping portion with the user touch area, where the observation information is used to indicate a user observation area for observing a display interface of a terminal device by the user;

an interface information module 804, configured to obtain user interface information, where the user interface information is used to indicate characteristics of a current interface of the terminal device or functions of interface elements in a current interface;

a sample obtaining module 805, configured to obtain a target sample from a sample library of the terminal device when the first determining module determines that the user observation area does not have an overlapping portion with the user touch area, where a sample observation area of the target sample matches the user observation area, and sample interface information of the target sample matches the user interface information, where the sample library stores at least one sample, and each sample includes a sample observation area, and a sample touch area, and sample interface information;

a second determining module 806, configured to determine whether the user touch area matches a sample touch area of the target sample; and a responding module 807, configured to:

respond to the touch instruction of the user when the first determining module determines that the user observation area has an overlapping portion with the user touch area; or respond to the touch instruction when the second determining module 806 determines that the user touch area matches the sample touch area of the target sample, and skip responding to the touch instruction when the second determining module 806 determines that the user touch area does not match the sample touch area of the target sample.

In the touch-control apparatus provided in this embodiment, if the first determining module 803 determines that a user observation area does not have an overlapping portion with a user touch area, the sample obtaining module 805 obtains a target sample from a sample library, and the second determining module 806 determines, according to the target sample, whether the responding module 807 responds to the touch instruction. The method provided in this embodiment specifically solves a problem how to distinguish a normal operation from a misoperation when the user observation area does not have an overlapping portion with the user touch area. When a user operates the terminal device, the user touch area is not located in the user observation area due to a personal habit, a program requirement, and so on, even if a normal operation is performed. By determining whether a user touch area matches a sample touch area, the apparatus provided in this embodiment determines whether a touch instruction is a normal operation instruction, which implements that a normal operation is distinguished from a misoperation.

Figure 9:
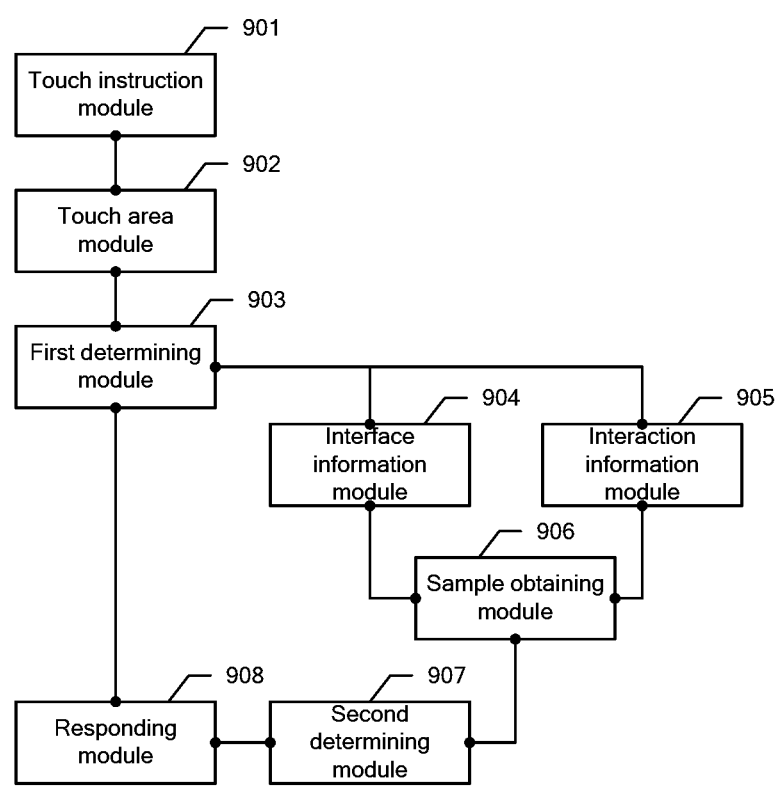
FIG. 9 is a structural diagram of another embodiment of a touch-control apparatus according to an embodiment of the present invention.

The apparatus provided in this embodiment shown in FIG. 8 may determine, according to a sample, whether to respond to a touch instruction, where the sample obtaining module 805 obtains a target sample by using a user observation area and user interface information. The following embodiment provides an apparatus that may obtain a target sample more accurately. Referring to FIG. 9, a basic structure of the apparatus includes:

a touch instruction module 901, configured to receive a touch instruction of a user;

a touch area module 902, configured to determine a user touch area corresponding to the touch instruction received by the touch instruction module;

a first determining module 903, configured to determine, according to the touch instruction and observation information, whether a user observation area has an overlapping portion with the user touch area, where the observation information is used to indicate a user observation area for observing a display interface of a terminal device by the user;

an interface information module 904, configured to obtain user interface information, where the user interface information is used to indicate characteristics of a current interface of the terminal device or functions of interface elements in a current interface;

an interaction information module 905, configured to obtain user interaction information, where the user interaction information is used to indicate a situation of interaction between the terminal device and the user;

a sample obtaining module 906, configured to obtain a target sample from a sample library of the terminal device when the first determining module determines that the user observation area does not have an overlapping portion with the user touch area, where a sample observation area of the target sample matches the user observation area, and sample interface information of the target sample matches the user interface information, and sample interaction information of the target sample matches the user interaction information, where the sample library stores at least one sample, and each sample includes a sample observation area, and a sample touch area, and sample interface information, and sample interaction information;

a second determining module 907, configured to determine whether the user touch area matches a sample touch area of the target sample; and a responding module 908, configured to respond to the touch instruction of the user when the first determining module determines that the user observation area has an overlapping portion with the user touch area; or respond to the touch instruction when the second determining module determines that the user touch area matches the sample touch area of the target sample, and skip responding to the touch instruction when the second determining module determines that the user touch area does not match the sample touch area of the target sample.

This embodiment, on a basis of the embodiment shown in FIG. 8, provides a touch-control apparatus. The apparatus may obtain a target sample from a sample library by using the sample obtaining module 906, so that the second determining module 907 determines whether the responding module 908 responds to a touch instruction. When the sample obtaining module 906 obtains the target sample from the sample library, not only a sample observation area of the target sample needs to match a user observation area, and sample interface information of the target sample needs to match user interface information, but also sample interaction information of the target sample needs to match user interaction information. Because the apparatus provided in this embodiment may determine whether the user interaction information matches the sample interaction information, the obtained target sample is closer to a situation of interaction with a terminal device when a user actually uses the terminal device, and further, a determination, which is made according to the sample, about whether to respond to the touch instruction, is also closer to the situation of interaction between the user and the terminal device, and a normal operation is distinguished from a misoperation more accurately.

Figure 10:
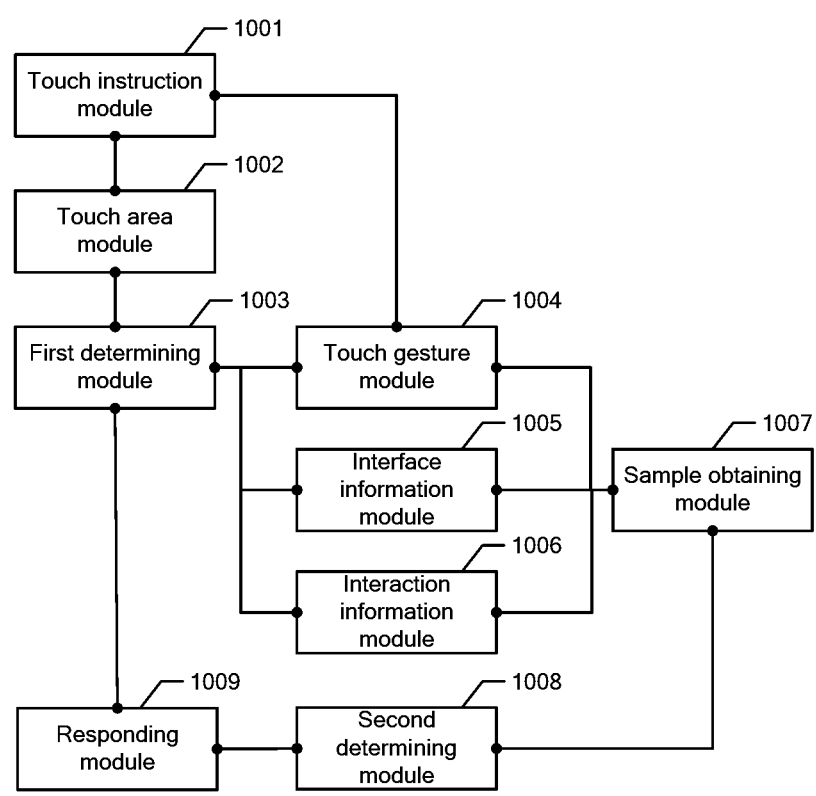
FIG. 10 is a structural diagram of another embodiment of a touch-control apparatus according to an embodiment of the present invention.

In the foregoing embodiment shown in FIG. 9, when obtaining the target sample from the sample library, the sample obtaining module 906 needs to make reference to the sample interaction information parameter, so that the obtained sample is closer to the situation of interaction between the user and the terminal device. In the following embodiment, a determining parameter is added in the case that a second determining module determines whether to respond to a touch instruction, so as to improve accuracy of a determining result. Referring to FIG. 10, a basic structure of the apparatus includes:

a touch instruction module 1001, configured to receive a touch instruction of a user;

a touch area module 1002, configured to determine a user touch area corresponding to the touch instruction received by the touch instruction module;

a first determining module 1003, configured to determine, according to the touch instruction and observation information, whether a user observation area has an overlapping portion with the user touch area, where the observation information is used to indicate a user observation area for observing a display interface of a terminal device by the user;

a touch gesture module 1004, configured to determine a user touch gesture corresponding to the touch instruction;

an interface information module 1005, configured to obtain user interface information, where the user interface information is used to indicate characteristics of a current interface of the terminal device or functions of interface elements in a current interface;

an interaction information module 1006, configured to obtain user interaction information, where the user interaction information is used to indicate a situation of interaction between the terminal device and the user;

a sample obtaining module 1007, configured to obtain a target sample from a sample library of the terminal device when the first determining module determines that the user observation area does not have an overlapping portion with the user touch area, where a sample observation area of the target sample matches the user observation area, and sample interface information of the target sample matches the user interface information, and sample interaction information of the target sample matches the user interaction information, where the sample library stores at least one sample, and each sample includes a sample observation area, and a sample touch area, and sample interface information, and sample interaction information, and a sample touch gesture;

a second determining module 1008, configured to determine whether the user touch area matches a sample touch area of the target sample, and determine whether the user touch gesture matches a sample touch gesture of the target sample; and a responding module 1009, configured to respond to the touch instruction of the user when the first determining module determines that the user observation area has an overlapping portion with the user touch area; or respond to the touch instruction when the second determining module determines that the user touch area matches the sample touch area of the target sample, and that the user touch gesture matches the sample touch gesture of the target sample, and skip responding to the touch instruction when the second determining module determines that the user touch area does not match the sample touch area of the target sample or the second determining module determines that the user touch gesture does not match the sample touch gesture of the target sample.

The interaction information module 1006 may be omitted. If the interaction information module 1006 is omitted, any sample in the sample library does not need to include sample interaction information, and when the sample obtaining module 1007 obtains the target sample from the sample library, the sample interaction information of the target sample does not need to match the user interaction information.

This embodiment, on a basis of the embodiment shown in FIG. 9, provides a touch-control apparatus, which determines, according to a target sample obtained from a sample library by the sample obtaining module 1007, whether the responding module 1009 responds to a touch instruction. When the second determining module 1008 determines whether to respond to a touch instruction, the second determining module 1008 needs to not only determine whether a user touch area matches a sample touch area of a target sample, but also determine whether a user touch gesture matches a sample touch gesture of the target sample. Only in a case in which it is determined that the user touch area matches the sample touch area of the target sample, and that the user touch gesture matches the sample touch gesture of the target sample, the responding module 1009 considers that the touch instruction is a touch instruction of a normal operation and makes a response. Compared with the foregoing embodiment in which the responding module 1009 only determines whether a user touch area matches a sample touch area of a target sample, a determining result of the responding module 1009 in this embodiment is more accurate because a determining parameter is added.

Figure 11:
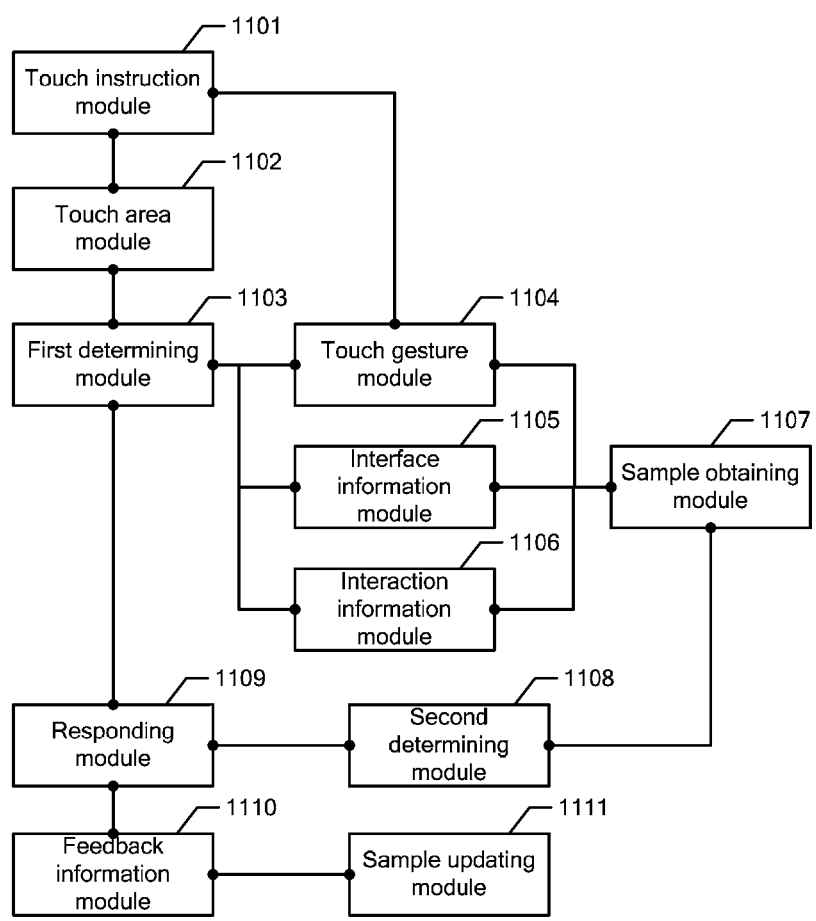
FIG. 11 is a structural diagram of another embodiment of a touch-control apparatus according to an embodiment of the present invention.

In the foregoing embodiments shown in FIG. 8 to FIG. 10, the touch-control apparatus may obtain a target sample from a sample library, and determine, according to the target sample, whether to respond to an operation instruction. On this basis, the following embodiment provides another touch-control apparatus, which may ensure timeliness of the sample library. Referring to FIG. 11, a basic structure of the apparatus includes:

a touch instruction module 1101, configured to receive a touch instruction of a user;

a touch area module 1102, configured to determine a user touch area corresponding to the touch instruction received by the touch instruction module;

a first determining module 1103, configured to determine, according to the touch instruction and observation information, whether a user observation area has an overlapping portion with the user touch area, where the observation information is used to indicate a user observation area for observing a display interface of a terminal device by the user;

a touch gesture module 1104, configured to determine a user touch gesture corresponding to the touch instruction;

an interface information module 1105, configured to obtain user interface information, where the user interface information is used to indicate characteristics of a current interface of the terminal device or functions of interface elements in a current interface;

an interaction information module 1106, configured to obtain user interaction information, where the user interaction information is used to indicate a situation of interaction between the terminal device and the user;

a sample obtaining module 1107, configured to obtain a target sample from a sample library of the terminal device when the first determining module determines that the user observation area does not have an overlapping portion with the user touch area, where a sample observation area of the target sample matches the user observation area, and sample interface information of the target sample matches the user interface information, and sample interaction information of the target sample matches the user interaction information, where the sample library stores at least one sample, and each sample includes a sample observation area, and a sample touch area, and sample interface information, and sample interaction information, and a sample touch gesture;

a second determining module 1108, configured to determine whether the user touch area matches a sample touch area of the target sample, and determine whether the user touch gesture matches a sample touch gesture of the target sample;

a responding module 1109, configured to respond to the touch instruction of the user when the first determining module determines that the user observation area has an overlapping portion with the user touch area; or respond to the touch instruction when the second determining module determines that the user touch area matches the sample touch area of the target sample, and that the user touch gesture matches the sample touch gesture of the target sample, and skip responding to the touch instruction when the second determining module determines that the user touch area does not match the sample touch area of the target sample or the second determining module determines that the user touch gesture does not match the sample touch gesture of the target sample;

a feedback information module 1110, configured to obtain feedback information of the user, where the feedback information is used to indicate whether the user accepts the response of the responding module to the touch instruction; and a sample updating module 1111, configured to update the target sample according to the feedback information.

The interaction information module 1106 may be omitted. If the interaction information module 1106 is omitted, any sample in the sample library does not need to include sample interaction information, and when the sample obtaining module 1107 obtains the target sample from the sample library, the sample interaction information of the target sample does not need to match the user interaction information.

The touch gesture module 1104 may be omitted. If the touch gesture module 1104 is omitted, any sample in the sample library does not need to include a sample touch gesture, and the second determining module 1108 does not need to determine whether the user touch gesture matches the sample touch gesture of the target sample.

This embodiment, on a basis of the embodiments shown in FIG. 8 to FIG. 10, provides a touch-control apparatus, where the sample obtaining module 1107 obtains a target sample from a sample library, and further, the second determining module 1108 determines whether the responding module 1109 responds to a touch instruction. In addition, the feedback information module 1110 further obtains feedback information of a user, and further, the sample updating module 1111 updates the target sample in the sample library. Compared with the foregoing embodiment, the apparatus provided in this embodiment may update the target sample according to the feedback of the user, which ensures timeliness of the sample library, so that samples in the sample library are more compliant with a use habit of the user.

Figure 12:
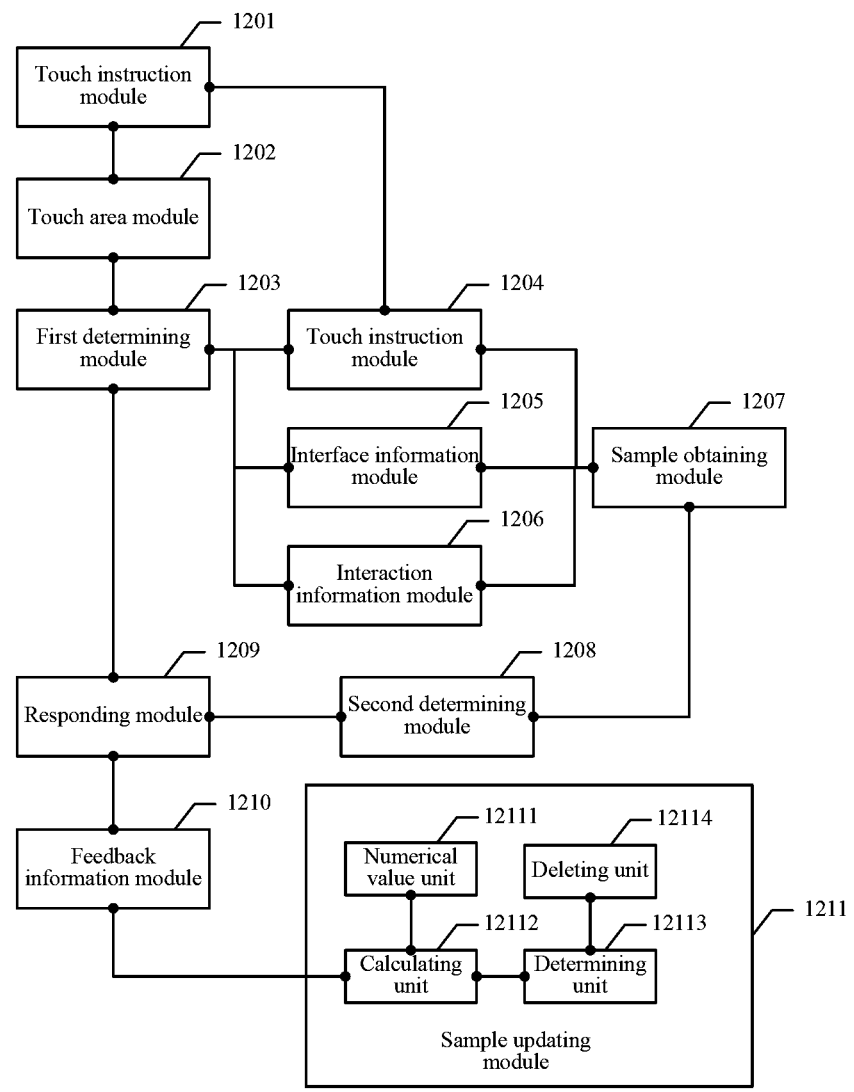
FIG. 12 is a structural diagram of another embodiment of a touch-control apparatus according to an embodiment of the present invention.

The foregoing embodiment shown in FIG. 11 provides a touch-control apparatus, where a sample updating module 1111 updates a target sample according to feedback information of a user, which ensures timeliness of a sample library. The following embodiment provides a more specific touch-control apparatus for updating a target sample. Referring to FIG. 12, a basic structure of the apparatus includes:

a touch instruction module 1201, configured to receive a touch instruction of a user;

a touch area module 1202, configured to determine a user touch area corresponding to the touch instruction received by the touch instruction module;

a first determining module 1203, configured to determine, according to the touch instruction and observation information, whether a user observation area has an overlapping portion with the user touch area, where the observation information is used to indicate a user observation area for observing a display interface of a terminal device by the user;

a touch gesture module 1204, configured to determine a user touch gesture corresponding to the touch instruction;

an interface information module 1205, configured to obtain user interface information, where the user interface information is used to indicate characteristics of a current interface of the terminal device or functions of interface elements in a current interface;

an interaction information module 1206, configured to obtain user interaction information, where the user interaction information is used to indicate a situation of interaction between the terminal device and the user;

a sample obtaining module 1207, configured to obtain a target sample from a sample library of the terminal device when the first determining module determines that the user observation area does not have an overlapping portion with the user touch area, where a sample observation area of the target sample matches the user observation area, and sample interface information of the target sample matches the user interface information, and sample interaction information of the target sample matches the user interaction information, where the sample library stores at least one sample, and each sample includes a sample observation area, and a sample touch area, and sample interface information, and sample interaction information, and a sample touch gesture;

a second determining module 1208, configured to determine whether the user touch area matches a sample touch area of the target sample, and determine whether the user touch gesture matches a sample touch gesture of the target sample;

a responding module 1209, configured to respond to the touch instruction of the user when the first determining module determines that the user observation area has an overlapping portion with the user touch area; or respond to the touch instruction when the second determining module determines that the user touch area matches the sample touch area of the target sample, and that the user touch gesture matches the sample touch gesture of the target sample, and skip responding to the touch instruction when the second determining module determines that the user touch area does not match the sample touch area of the target sample or the second determining module determines that the user touch gesture does not match the sample touch gesture of the target sample;

a feedback information module 1210, configured to obtain feedback information of the user, where the feedback information is used to indicate whether the user accepts the response of the responding module to the touch instruction; and a sample updating module 1211, configured to update the target sample according to the feedback information. In this embodiment, the sample updating module 1211 includes:

a numerical value unit 12111, configured to determine an accumulative value corresponding to the target sample;

a calculating unit 12112, specifically configured to increase the accumulative value when the user accepts the response of the responding module to the touch instruction, and decrease the accumulative value when the user does not accept the response of the responding module to the touch instruction;

a determining unit 12113, configured to determine whether the accumulative value corresponding to the target sample is less than a preset value; and a deleting unit 12114, configured to delete the target sample when a determining result of the determining unit is that the accumulative value corresponding to the target sample is less than the preset value.

The interaction information module 1206 may be omitted. If the interaction information module 1206 is omitted, any sample in the sample library does not need to include sample interaction information, and when the sample obtaining module 1207 obtains the target sample from the sample library, the sample interaction information of the target sample does not need to match the user interaction information.

The touch gesture module 1204 may be omitted. If the touch gesture module 1204 is omitted, any sample in the sample library does not need to include a sample touch gesture, and the second determining module 1208 does not need to determine whether the user touch gesture matches the sample touch gesture of the target sample.

This embodiment provides an apparatus that may update a target sample. The apparatus may determine an accumulative value corresponding to a target sample by using a numerical value unit 12111; a calculating unit 12112 performs accumulation for the accumulative value according to feedback information of a user; and finally, a deleting unit 12114 deletes a sample with an accumulative value less than a preset value, thereby implementing an update of the target sample. The apparatus provided in this embodiment may continuously delete samples that are not compliant with a use habit of the user, to ensure timeliness of a sample library.

To make the foregoing embodiment comprehensible, a specific application scenario is hereinafter used as an example for description.

A user browses a webpage by using a mobile phone. In the browsing process, a finger of the user touches an advertisement link on the left of the webpage. A touch instruction module 1201 of the mobile phone receives a touch instruction sent by the user by touching the advertisement link.

A touch area module 1202 obtains a touch area corresponding to the touch instruction, where the touch area is located on the left of a touchscreen of the mobile phone. However, after taking a photo by using a front-facing camera and making analysis, the mobile phone learns that a line of sight of the user focuses on the center of the touchscreen of the mobile phone, and a first determining module 1203 determines that the user touch area does not have an overlapping portion with an area on which the line of sight of the user focuses.

An interface information module 1205 obtains current interface information, where the interface information includes that: the advertisement link is on the left of the interface, webpage text is in the middle part of the interface, and functional menus of the webpage are in the upper part of the interface.

An interaction information module 1206 obtains current interaction information, where the interaction information includes that: the user holds the mobile phone with both hands.

A user touch mode obtained by a touch gesture module 1204 is a tap with a left thumb.

A sample obtaining module 1207 obtains a target sample from a model library stored in a memory of the mobile phone. Information in the sample includes that: a user observation area is located in the center of the touchscreen; the advertisement link is on the left of the current interface, webpage text is in the middle part, and functional menus of the webpage are in the upper part; currently, the user holds the mobile phone with both hands; a sample touch area is an area except the advertisement link on the left; and a sample touch gesture is a slide by any finger or a tap by a right forefinger.

A second determining module 1208 determines that the user touch area does not have an overlapping portion with the sample touch area of the target sample, and that the user touch mode is also not included in the sample touch gesture of the target sample. Therefore, a responding module 1209 does not respond to the touch operation of the user.

Then, the user touches the advertisement information repeatedly, and a feedback information module 1210 receives the touch instruction of the repeated touch, and considers that a purpose of the repeated operation of the user is to open the advertisement information. Therefore, a response is made to the touch instruction of the user.

A numerical value unit 12111 determines that an accumulative value corresponding to the sample is 101, and a calculating unit 12112 subtracts 2 from the accumulative value to obtain a new accumulative value 99.

A preset value in the mobile phone is 100. A determining unit 12113 determines that the new accumulative value 99 is less than 100, and therefore, a deleting unit 12114 deletes the target sample.

Figure 13:
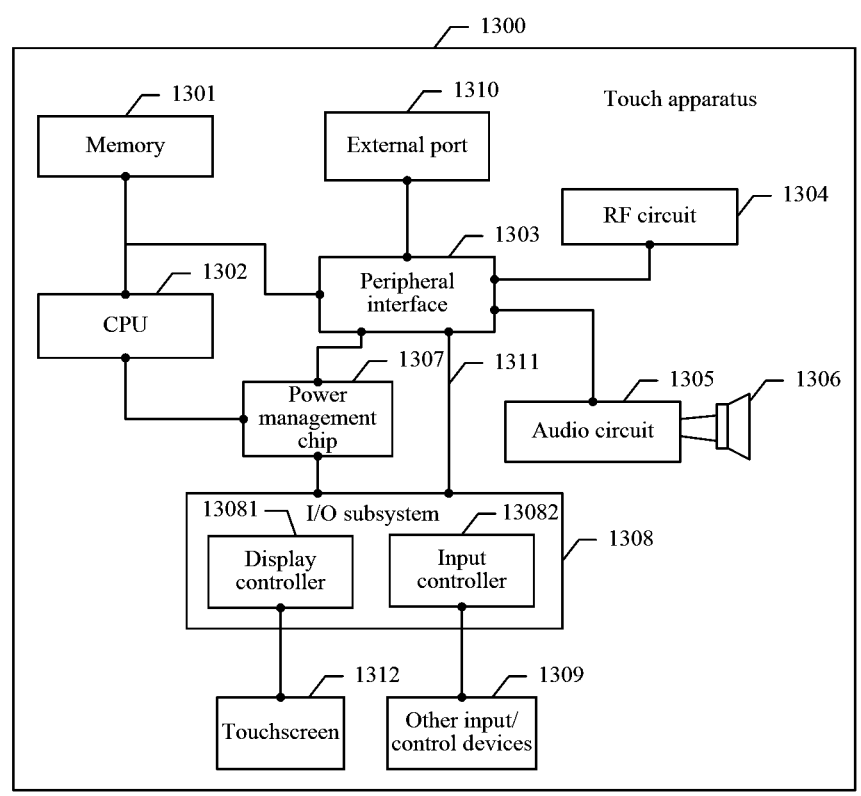
FIG. 13 is a structural diagram of another embodiment of a touch-control apparatus according to an embodiment of the present invention.

The foregoing describes the touch-control apparatus in the embodiment of the present invention from a perspective of a unit functional entity. The following describes the touch-control apparatus in the embodiment of the present invention from a perspective of hardware processing. Referring to FIG. 13, another embodiment of a touch-control apparatus 1300 in an embodiment of the present invention includes: a memory 1301, a central processing unit (Central Processing Unit, CPU for short) 1302, a peripheral interface 1303, an RF circuit 1304, an audio circuit 1305, a speaker 1306, a power management chip 1307, an input/output (I/O) subsystem 1308, another input/control device 1309, and an external port 1310. These components communicate with each other through one or more communication buses or signal cables 1311.

It should be noted that the touch-control apparatus provided in this embodiment is only an example of the touch-control apparatus provided in the embodiments of the present invention, and that the number of components of the touch-control apparatus involved in the embodiment of the present invention may be greater than or less than that shown in FIG. 13, where two or more components may be combined, or different components may be configured or set, and each component may be implemented in hardware that includes one or more signal processing and/or dedicated integrated circuits, or in software, or in a combination of hardware and software.

The following describes the touch-control apparatus provided in this embodiment in detail.

Memory 1301: The memory 1301 may be accessed by the CPU 1302, peripheral interface 1303, and so on. The memory 1301 may include a high-speed random access memory, or may further include a non-volatile memory, for example, one or more disk storage devices, flash memories, or other volatile solid-state storage devices.

Peripheral interface 1303: The peripheral interface may connect input and output peripherals of the device to the CPU 1302 and memory 1301.

I/O subsystem 1308: The I/O subsystem 1308 may connect input and output peripherals of the device, for example, the touchscreen 1312 and the other input/control devices 1309, to the peripheral interface 1303. The I/O subsystem 1308 may include a display controller 13081 and one or more input controllers 13082 for controlling the other input/control devices 1309. The one or more input controllers 13082 receive electrical signals from the other input/control devices 1309, or send electrical signals to the other input/control devices 1309. The other input/control devices 1309 may include a physical button (press button, rocker arm button, and so on), a dial, a slide switch, a joystick, and a scroll wheel. It should be noted that the input controller 13082 may be connected to any one of the following: a keyboard, an infrared port, a USB interface, and an indicating device such as a mouse.

Touch screen 1312: The touchscreen 1312 is an output interface between a mobile terminal and a user, and displays a visual output to the user. The visual output may include a picture, a text, an icon, a video, and so on.

The display controller 13081 in the I/O subsystem 1308 receives electrical signals from the touchscreen 1312, or sends electrical signals to the touchscreen 1312. The touchscreen 1312 detects a touch on the touchscreen. The display controller 13081 converts the detected touch into interaction with a user interface object displayed on the touchscreen 1312, that is, man-machine interaction is implemented. The user interface object displayed on the touchscreen 1312 may be an icon of a running game, an icon for connecting to a corresponding network, and so on. It should be noted that the device may further include an optical mouse. The optical mouse is a touch-sensitive surface that does not display a visual output, or is an extension of a touch-sensitive surface formed by the touchscreen.

RF circuit 1304: It is mainly configured to establish communication between the touch-control apparatus and a wireless network (namely, a network side), and implement data receiving and sending between the touch-control apparatus and the wireless network, for example, receiving and sending SMS messages, e-mails, and so on. Specifically, the RF circuit 1304 receives and sends RF signals. RF signals are also referred to as electromagnetic signals. The RF circuit 1304 converts an electrical signal into an electromagnetic signal or converts an electromagnetic signal into an electrical signal, and communicates with a communication network or another device by using the electromagnetic signal. The RF circuit 1304 may include known circuits that execute these functions, including but not limited to an antenna system, an RF transceiver, one or more amplifiers, a tuner, one or more oscillators, a digital signal processor, a CODEC chip set, a subscriber identity module (Subscriber Identity Module, SIM), and so on.

Audio circuit 1305: It is mainly configured to receive audio data from the peripheral interface 1303, convert the audio data into an electrical signal, and send the electrical signal to the speaker 1306.

Speaker 1306: It is configured to restore a voice signal, which is received by the touch-control apparatus from the wireless network through the RF circuit 1304, into a sound, and play the sound to the user.

Power management chip 1307: It is configured to supply power to the CPU 1302, the I/O subsystem, and the hardware connected to the peripheral interface, and perform power management.

It should be understood that the touch-control apparatus 1300 is only an example of a touch-control apparatus provided by an embodiment of the present invention, and that the number of components of the touch-control apparatus 1300 may be greater than or less than that shown in the figure, where two or more components may be combined, or different components may be configured. Each component shown in the figure may be implemented in hardware that includes one or more signal processing and/or dedicated integrated circuits, or in software, or in a combination of hardware and software.

Figure 14:
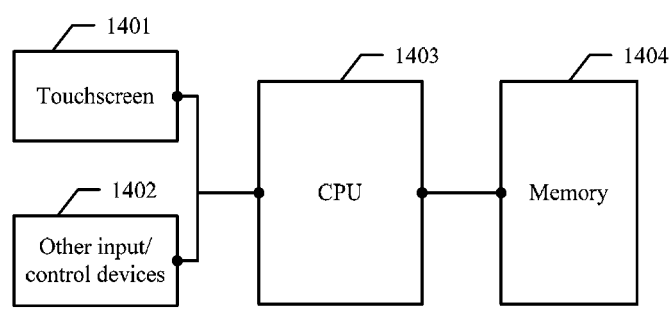
FIG. 14 is a structural diagram of another embodiment of a touch-control apparatus according to an embodiment of the present invention.

FIG. 14 is a structural diagram of parts inside a touch-control apparatus.

A touchscreen 1401 is configured to receive a touch instruction of a user.

Other input/control devices 1402 are configured to obtain user interface information, obtain user interaction information, and obtain feedback information of a user.

A memory 1404 is configured to store a sample library. The sample library stores at least one sample, where each sample includes a sample observation area, and a sample touch area, and sample interface information, and sample interaction information, and a sample touch gesture.

A CPU 1403 is specifically configured to:

determine a user touch area corresponding to the touch instruction received by the touchscreen 1401;

determine, according to the touch instruction and observation information, whether a user observation area has an overlapping portion with the user touch area, and if the user observation area has an overlapping portion with the user touch area, respond to the touch instruction; where, the observation information is used to indicate the user observation area in which the user observes a display interface of a terminal device;

when the user observation area does not have an overlapping portion with the user touch area, obtain a target sample from the sample library of the memory 1404, where a sample observation area of the target sample matches the user observation area, and sample interface information of the target sample matches the user interface information obtained by the other input/control devices 1402, and sample interaction information of the target sample matches the user interaction information obtained by the other input/control devices 1402;

determine a user touch gesture corresponding to the touch instruction;

determine whether the user touch area matches a sample touch area of the target sample, and determine whether the user touch gesture matches a sample touch gesture of the target sample;

respond to the touch instruction if the user touch area matches the sample touch area of the target sample, and the user touch gesture matches the sample touch gesture of the target sample, and skip responding to the touch instruction if the user touch area does not match the sample touch area of the target sample, or a second determining module determines that the user touch gesture does not match the sample touch gesture of the target sample;

determine an accumulative value corresponding to the target sample;

determine, according to the feedback information of the user, whether the user accepts the response of the touch-control apparatus to the touch instruction, and when the user accepts a response of a responding module to the touch instruction, increase the accumulative value, or when the user does not accept a response of a responding module to the touch instruction, decrease the accumulative value;

determine whether the accumulative value corresponding to the target sample is less than a preset value; and when a determining result of a determining unit is that the accumulative value corresponding to the target sample is less than the preset value, delete the target sample.

In the foregoing embodiments, the CPU 1302 and CPU 1403 may specifically be Pentium series processors or Itanium processors and so on, which are produced by Intel Corporation.

In the foregoing embodiments of the present invention, the touch-control apparatus includes but is not limited to a mobile communication device, such as a mobile phone, a personal digital assistant (Personal Digital Assistant, PDA), and a tablet computer.

It should be noted that persons of ordinary skill in the art may understand that all or a part of processes in the methods of the foregoing embodiments may be implemented by related hardware instructed by a computer program. The program may be stored in a computer readable storage medium and when executed, may include the processes of the embodiments of the foregoing methods. The storage medium may be a magnetic disk, an optical disc, a read-only memory, or a random access memory.

An embodiment of the present invention further provides a terminal device, including the touch-control apparatus shown in any one figure of FIG. 7 to FIG. 14.

It may be clearly understood by a person skilled in the art that, for ease and brevity of description, for a detailed working process of the foregoing system, apparatus, and unit, reference may be made to a corresponding process in the foregoing method embodiments, and details are not repeatedly described herein.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A touch-control method, comprising:
   storing, by a terminal device, a sample library in a memory of the terminal device, wherein the sample library stores at least one sample, wherein the at least one sample comprises a sample observation area, a sample touch area, and sample interface information;
   obtaining, by the terminal device, user interface information, wherein the user interface information is used to indicate characteristics of a current interface of the terminal device or functions of interface elements in the current interface;
   receiving, by the terminal device, a touch instruction of a user;
   determining, by the terminal device, a user touch area corresponding to the touch instruction;
   determining, by the terminal device, whether a user observation area has an overlapping portion with the user touch area; and
   when the user observation area has an overlapping portion with the user touch area, responding by the terminal device, to the touch instruction of the user;
   when the user observation area does not have an overlapping portion with the user touch area, obtaining, by the terminal device, a target sample from the sample library, wherein a sample observation area of the target sample matches the user observation area, and sample interface information of the target sample matches the user interface information;
   determining, by the terminal device, whether the user touch area matches a sample touch area of the target sample;
   responding, by the terminal device, to the touch instruction, when the user touch area matches the sample touch area of the target sample; and
   skipping responding, by the terminal device, to the touch instruction when the user touch area does not match the sample touch area of the target sample.

2. The touch-control method according to claim 1, wherein the user interface information comprises: luminance of the user interface, or the functions of the interface elements, or sizes of the interface elements, or locations of the interface elements in the interface of the terminal device, or a relationship between at least two interface elements.

3. The touch-control method according to claim 1, wherein the method further comprises:
   obtaining, by the terminal device, user interaction information, wherein the user interaction information is used to indicate a situation of interaction between the terminal device and the user; and
   the at least one sample in the sample library further comprises sample interaction information; and
   the obtaining, by the terminal device, a target sample from the sample library, wherein a sample observation area of the target sample matches the user observation area, and sample interface information of the target sample matches the user interface information comprises:
   obtaining, by the terminal device, the target sample from the sample library, wherein the sample observation area of the target sample matches the user observation area, and the sample interface information of the target sample matches the user interface information, and sample interaction information of the target sample matches the user interaction information.

4. The touch-control method according to claim 3, wherein the situation of interaction comprises: a user hand-holding mode, or a user posture, or a user motion status, or environmental luminance, or an environmental place, or an environmental time, or environmental interference.

5. The touch-control method according to claim 1, wherein the method further comprises:
   determining, by the terminal device, a user touch gesture corresponding to the touch instruction; wherein
   the at least one sample in the sample library further comprises a sample touch gesture;
   the determining, by the terminal device, whether the user touch area matches a sample touch area of the target sample comprises: determining, by the terminal device, whether the user touch area matches the sample touch area of the target sample, and whether the user touch gesture matches a sample touch gesture of the target sample;

the responding, by the terminal device, to the touch instruction when the user touch area matches the sample touch area of the target sample comprises: when the user touch area matches the sample touch area of the target sample, and the user touch gesture matches the sample touch gesture of the target sample, responding, by the terminal device, to the touch instruction; and the skipping responding, by the terminal device, to the touch instruction when the user touch area does not match the sample touch area of the target sample comprises: when the user touch area does not match the sample touch area of the target sample, or the user touch gesture does not match the sample touch gesture of the target sample, skipping responding, by the terminal device, to the touch instruction.

6. The touch-control method according to claim 1, wherein the method further comprises:

obtaining, by the terminal device, feedback information of the user, wherein the feedback information is used to indicate whether the user accepts the response of the terminal device to the touch instruction; and updating, by the terminal device, the target sample according to the feedback information.

7. The touch-control method according to claim 6, wherein the updating, by the terminal device, the target sample according to the feedback information, comprises:

determining, by the terminal device, an accumulative value corresponding to the target sample;

when the feedback information indicates that the user accepts the response of the terminal device to the touch instruction, increasing, by the terminal device, the accumulative value;

when the feedback information indicates that the user does not accept the response of the terminal device to the touch instruction, decreasing, by the terminal device, the accumulative value; and when the accumulative value corresponding to the target sample is less than a preset value, deleting, by the terminal device, the target sample.

8. A touch-control apparatus, comprising:

a memory, configured to store a sample library, wherein the sample library stores at least one sample, wherein the at least one sample comprises a sample observation area, a sample touch area, and sample interface information; and a processor, configured to obtain user interface information, wherein the user interface information is used to indicate characteristics of a current interface of the touch-control apparatus or functions of interface elements in the current interface; and a touch screen, configured to receive a touch instruction of a user;

wherein, the processor is further configured to determine a user touch area corresponding to the touch instruction received by the touch screen, determine whether a user observation area has an overlapping portion with the user touch area, and respond to the touch instruction of the user when the processor determines that the user observation area has an overlapping portion with the user touch area wherein the processor is further configured to obtain a target sample from the sample library in the memory when the processor determines that the user observation area does not have an overlapping portion with the user touch area, wherein a sample observation area of the target sample matches the user observation area, and sample interface information of the target sample matches the user interface information; and the processor is further configured to determine whether the user touch area matches a sample touch area of the target sample, respond to the touch instruction when the processor determines that the user touch area matches the sample touch area of the target sample, and skip responding to the touch instruction when the processor determines that the user touch area does not match the sample touch area of the target sample.

9. The touch-control apparatus according to claim 8, wherein:

the processor is further configured to obtain user interaction information, wherein the user interaction information is used to indicate a situation of interaction between the terminal device and the user; and the at least one sample in the sample library further comprises sample interaction information; and the processor is further configured to obtain the target sample from the sample library when the processor determines that the user observation area does not have an overlapping portion with the user touch area, wherein the sample observation area of the target sample matches the user observation area, and the sample interface information of the target sample matches the user interface information, and sample interaction information of the target sample matches the user interaction information.

10. The touch-control apparatus according to claim 8, wherein:

the processor is further configured to determine a user touch gesture corresponding to the touch instruction; and the at least one sample in the sample library further comprises a sample touch gesture; and the processor is further configured to determine whether the user touch area matches the sample touch area of the target sample, and determine whether the user touch gesture matches a sample touch gesture of the target sample; and configured to respond to the touch instruction when the processor determines that the user touch area matches the sample touch area of the target sample, and that the user touch gesture matches the sample touch gesture of the target sample, or skip responding to the touch instruction when the processor determines that the user touch area does not match the sample touch area of the target sample, or the processor determines that the user touch gesture does not match the sample touch gesture of the target sample.

11. The touch-control apparatus according to claim 8, wherein:

the processor is further configured to obtain feedback information of the user, wherein the feedback information is used to indicate whether the user accepts the response of the processor to the touch instruction; and configured to update the target sample according to the feedback information.

12. The touch-control apparatus according to claim 11, wherein the processor is further configured to:

determine an accumulative value corresponding to the target sample; and increase the accumulative value when the user accepts the response of the processor to the touch instruction, and decrease the accumulative value when the user does not accept the response of the processor to the touch instruction; and determine whether the accumulative value corresponding to the target sample is less than a preset value; and delete the target sample when a determining result of the processor is that the accumulative value corresponding to the target sample is less than the preset value.

13. A terminal device, comprising a touch screen, a processor, a memory; wherein:

the memory, configured to store a sample library, wherein the memory stores at least one sample, and the at least one sample comprises a sample observation area, and a sample touch area, and sample interface information; and a processor, configured to obtain user interface information, wherein the user interface information is used to indicate characteristics of a current interface of the terminal device or functions of interface elements in the current interface; and the touch screen configured to receive a touch instruction of a user;

wherein, the processor is further configured to determine a user touch area corresponding to the touch instruction received by the touch screen; and configured to determine whether a user observation area has an overlapping portion with the user touch area, and configured to respond to the touch instruction of the user when the processor determines that the user observation area has an overlapping portion with the user touch area, wherein the processor is further configured to obtain a target sample from the sample library in the memory when the processor determines that the user observation area does not have an overlapping portion with the user touch area, wherein a sample observation area of the target sample matches the user observation area, and sample interface information of the target sample matches the user interface information; and the processor is further configured to determine whether the user touch area matches a sample touch area of the target sample, respond to the touch instruction when the processor determines that the user touch area matches the sample touch area of the target sample, and skip responding to the touch instruction when the processor determines that the user touch area does not match the sample touch area of the target sample.

14. The terminal device according to claim 13, wherein:
the processor is further configured to obtain user interaction information, wherein the user interaction information is used to indicate a situation of interaction between the terminal device and the user; and the at least one sample in the sample library further comprises sample interaction information; and the processor is further configured to obtain the target sample from the sample library when the processor determines that the user observation area does not have an overlapping portion with the user touch area, wherein the sample observation area of the target sample matches the user observation area, and the sample interface information of the target sample matches the user interface information, and sample interaction information of the target sample matches the user interaction information.

15. The terminal device according to claim 13, wherein:
the processor is further configured to determine a user touch gesture corresponding to the touch instruction; and the at least one sample in the sample library further comprises a sample touch gesture; and the processor is further configured to determine whether the user touch area matches the sample touch area of the target sample, and determine whether the user touch gesture matches a sample touch gesture of the target sample; and configured to respond to the touch instruction when the processor determines that the user touch area matches the sample touch area of the target sample, and that the user touch gesture matches the sample touch gesture of the target sample, or skip responding to the touch instruction when the processor determines that the user touch area does not match the sample touch area of the target sample, or the processor determines that the user touch gesture does not match the sample touch gesture of the target sample.

16. The terminal device according to claim 13, wherein:
the processor is further configured to obtain feedback information of the user, wherein the feedback information is used to indicate whether the user accepts the response of the processor to the touch instruction; and configured to update the target sample according to the feedback information.

17. The terminal device according to claim 16, wherein the processor is further configured to determine an accumulative value corresponding to the target sample; and increase the accumulative value when the user accepts the response of the processor to the touch instruction, and decrease the accumulative value when the user does not accept the response of the processor to the touch instruction; and determine whether the accumulative value corresponding to the target sample is less than a preset value; and delete the target sample when a determining result of the processor is that the accumulative value corresponding to the target sample is less than the preset value.

* * * * *